United States Patent [19]

Ahlen et al.

[11] 4,262,335
[45] Apr. 14, 1981

[54] VEHICLE TRANSMISSION CONTROL SYSTEM

[75] Inventors: Karl G. Ahlen, Bromma; Gunnar Wahlsten, Taeby; Joseph Supanich, Bromma, all of Sweden

[73] Assignee: S.R.M. Hydromekanik, Stockholm, Sweden

[21] Appl. No.: 3,527

[22] Filed: Jan. 15, 1979

[30] Foreign Application Priority Data

| Aug. 18, 1978 | [GB] | United Kingdom | 33809/78 |
| Aug. 24, 1978 | [GB] | United Kingdom | 34391/78 |
| Nov. 6, 1978 | [GB] | United Kingdom | 43313/78 |
| Nov. 6, 1978 | [GB] | United Kingdom | 43315/78 |
| Nov. 21, 1978 | [GB] | United Kingdom | 45431/78 |
| Nov. 21, 1978 | [GB] | United Kingdom | 45432/78 |

[51] Int. Cl.$^3$ .................. G06F 15/20; B60K 41/18
[52] U.S. Cl. .................. 364/431; 74/752 D; 74/866; 364/424
[58] Field of Search .................. 364/431, 424, 425; 74/752 D, 859, 866

[56] References Cited

U.S. PATENT DOCUMENTS

| 3,640,156 | 2/1972 | Mori et al. | 74/866 |
| 3,702,572 | 11/1972 | Wakamatsu et al. | 74/866 |
| 3,937,105 | 2/1976 | Arai et al. | 74/866 |
| 4,033,202 | 7/1977 | Ahlen et al. | 74/866 |
| 4,107,776 | 8/1978 | Beale | 364/431 |
| 4,155,277 | 5/1979 | Minami et al. | 74/866 |

FOREIGN PATENT DOCUMENTS

2658464 6/1978 Fed. Rep. of Germany .............. 74/866

*Primary Examiner*—Felix D. Gruber
*Attorney, Agent, or Firm*—Larson, Taylor and Hinds

[57] ABSTRACT

A vehicle transmission system is provided which comprises, in combination, a vehicle transmission and an electronic control system for converting input signals thereto related to operating conditions of the transmission to output control signals for the transmission in accordance with a predetermined set of criteria. The electronic control system senses a plurality of operating conditions of the transmission and produces digital input signals in accordance therewith, and includes a microprocessor for directly monitoring the state of the digital input signals, a programmable read-only memory connected to the microprocessor, a timing set-up for directly delivering clock pulses to the microprocessor, an output arrangement, connected to the microprocessor and including a latch, for producing output control signals, an addressing unit for coordinating the operation of the programmable read-only memory and the latch under the control of the microprocessor, and a random access memory for storing the states of signals being processed and enabling arithmetical operations to be performed with the stored signal states. A movement sensor senses shaft speeds so as to produce at least one of the digital input signals. The programmable read-only memory stores a series of coded instructions for repetitively controlling the operation of the microprocessor such that, on the basis of the input signals, output signals are produced which are transmitted to electromechanical operators, e.g., solenoid valves or relays, which control the operation of the transmission.

41 Claims, 16 Drawing Figures

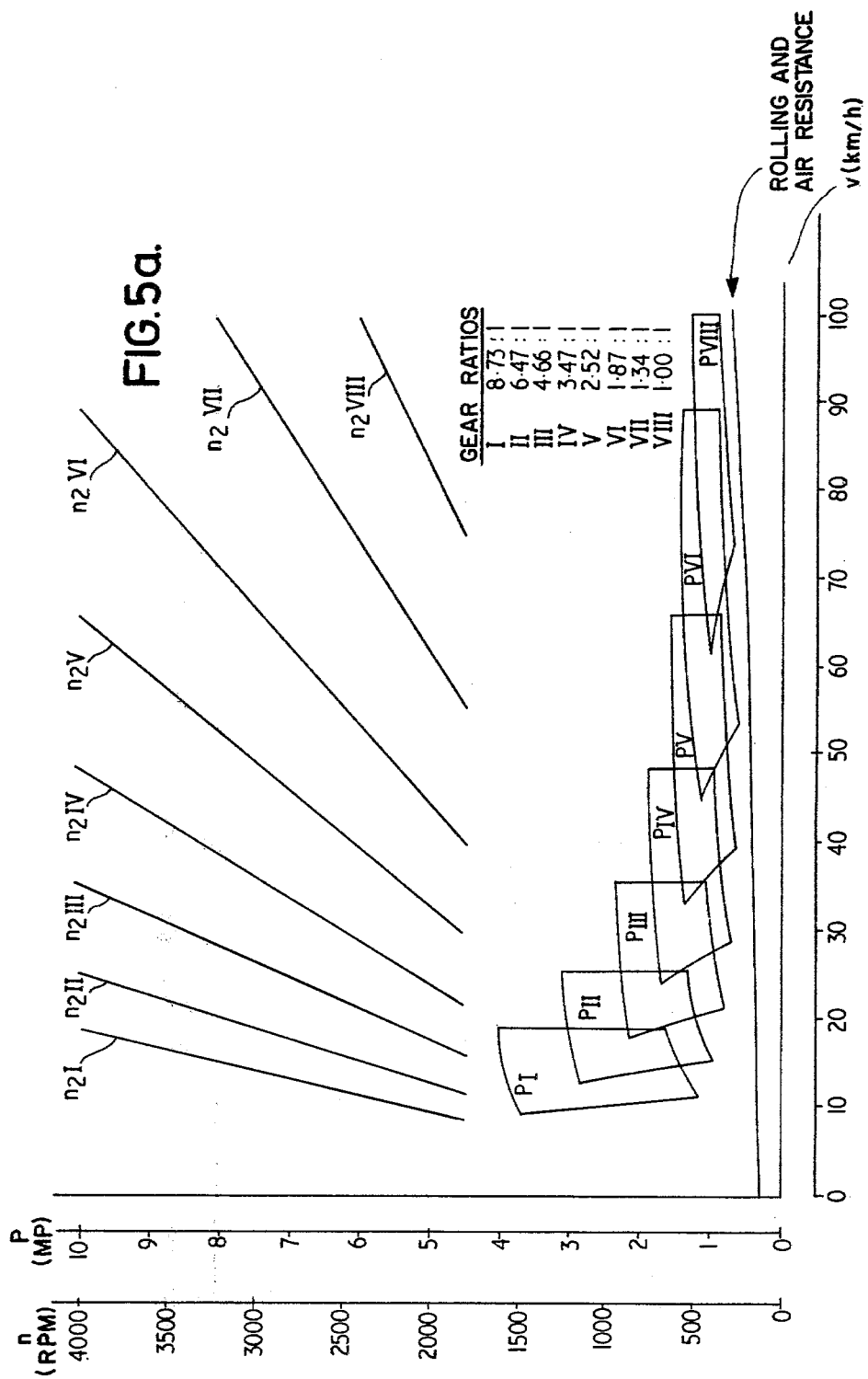

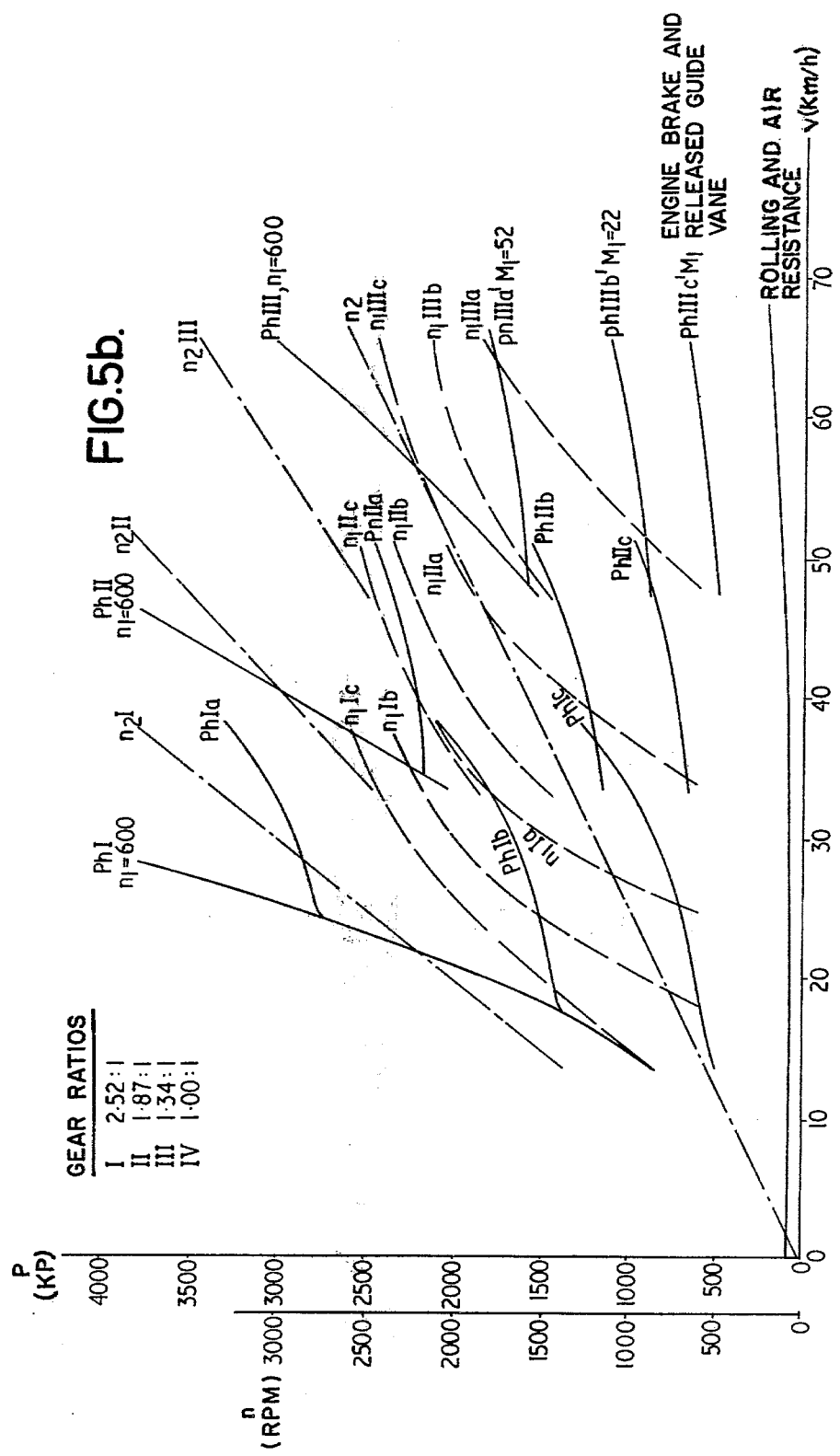

FIG.6a.

Regarding driving conditions. DS transmission with 144R matching gear.

Throttle 10% up to full throttle
Position or value indifferent to the transmission
Depends on gear connected.
Zero.

Driving Conditions

| | CONTACTORS | | | |
|---|---|---|---|---|
| | FN Forward released pump. | F Forward | RN Reverse released pump. | R Reverse. |
| | 1 | 2 | 3 | 4 |
| 1. Connection for drive forward: stillstanding vehicle  A) DR | | | | |
| 2. Start driving, double rotation conn. pump | | | | |
| 3. Driving single rotation  A) Low to high throttle  B) KD | | | | |
| 4 Direct drive  A) Connection pick-up  B) Automatic connection, part load up to full throttle  C) Automatic connection at kick-down. | | | | |
| 5. Hydraulic braking (In direct drive)  A) SR  B) DR | | | | |
| 5A. Hydraulic braking overdrive  A) 1st gear  B) 2nd gear  C) 3rd gear  D) 4th gear | | | | |
| 6. A) Release direct drive below n1=1700 KD  B) Release direct drive of throttle position between 10% and KD  C) Release direct drive zero throttle position  D) -- -- -- -- -- -- and braking | | | | |
| 7. Free-wheel action (coasting) | | | | |
| Stopping | | | | |
| 8. Reverse (second gear)  A) Connection for reverse RN  B) Driving in reverse R | | | | |

BASIC CONDITION FOR DRIVE.

| | | |
|---|---|---|
| A | STARTING KEY CONN. OF ELECTRIC SOURCE | |
| B | VOLTAGE RELAY | |
| C | OIL LEVEL TOO HIGH OR TOO LOW | |
| D | OIL TEMPERATURE TOO HIGH | |
| E | POSITIVE NEUTRAL GEAR AND CONVERTER RELEASED | |
| F | HANDBRAKE AND/OR PARKING BRAKE | |
| | CONDITION FOR DRIVING | |
| | CONDITION FOR STARTING AND TESTING OF ENGINE | |

| 1 | 2 | 3 | 4 |
|---|---|---|---|
| Conn. to EH valve 16 | Conn. to the computer | Conn. to the valve 17 | Conn. to the computer |

From switches to box
From box to gear (9)

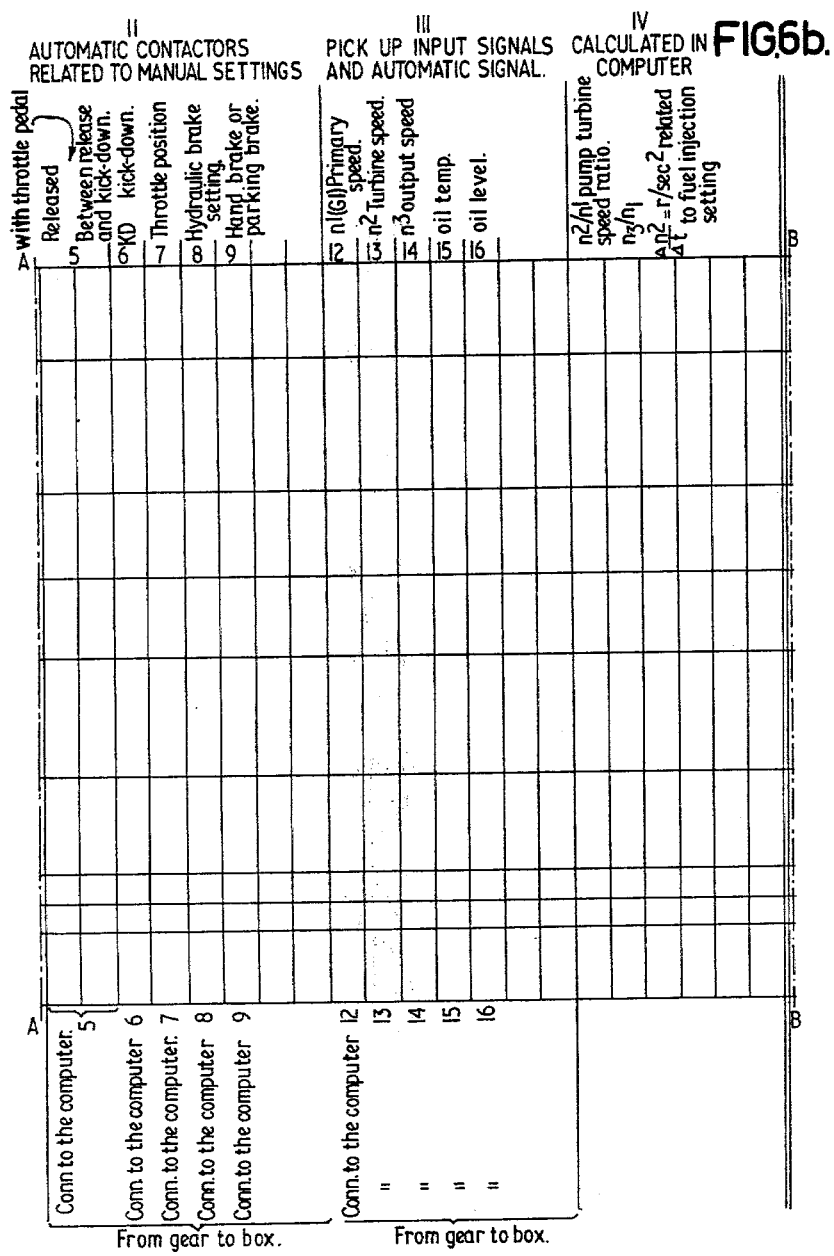

FIG. 6c

V — NEGATIVE SIGNALS

| B | DRV double rotation drive. | SRV single rotation drive. | HV hydraulic drive pump-connection. | DV direct drive. | FV forward connected. | RV reverse connected. | max. oil pressure valve hydraulic drive. | Disconnection relay for oil level and/or temp. |
|---|---|---|---|---|---|---|---|---|
| 19 | 20 | 21 | 22 | 23 | 24 | 25 | 26 | |

Conn. from the computer 19, 20, 21, 22, 23, 24, 25, 26 over transistor.

From box to converter (9)

VI — POSITION AND/OR CONNECTION SIGNALS M4+M2 OR M4+U+M2

| 1:st | 2:nd | 3:rd | 4:th | Dir Overdrive | Dir High | Dir Range gear | Low |
|---|---|---|---|---|---|---|---|
| 30 | 31 | 32 | 33 | 34 | 35 | 36 | 37 |

Conn. from the computer 30, 31, 32, 33, 34, 35, 36, 37 over transistor.

From box to gear.

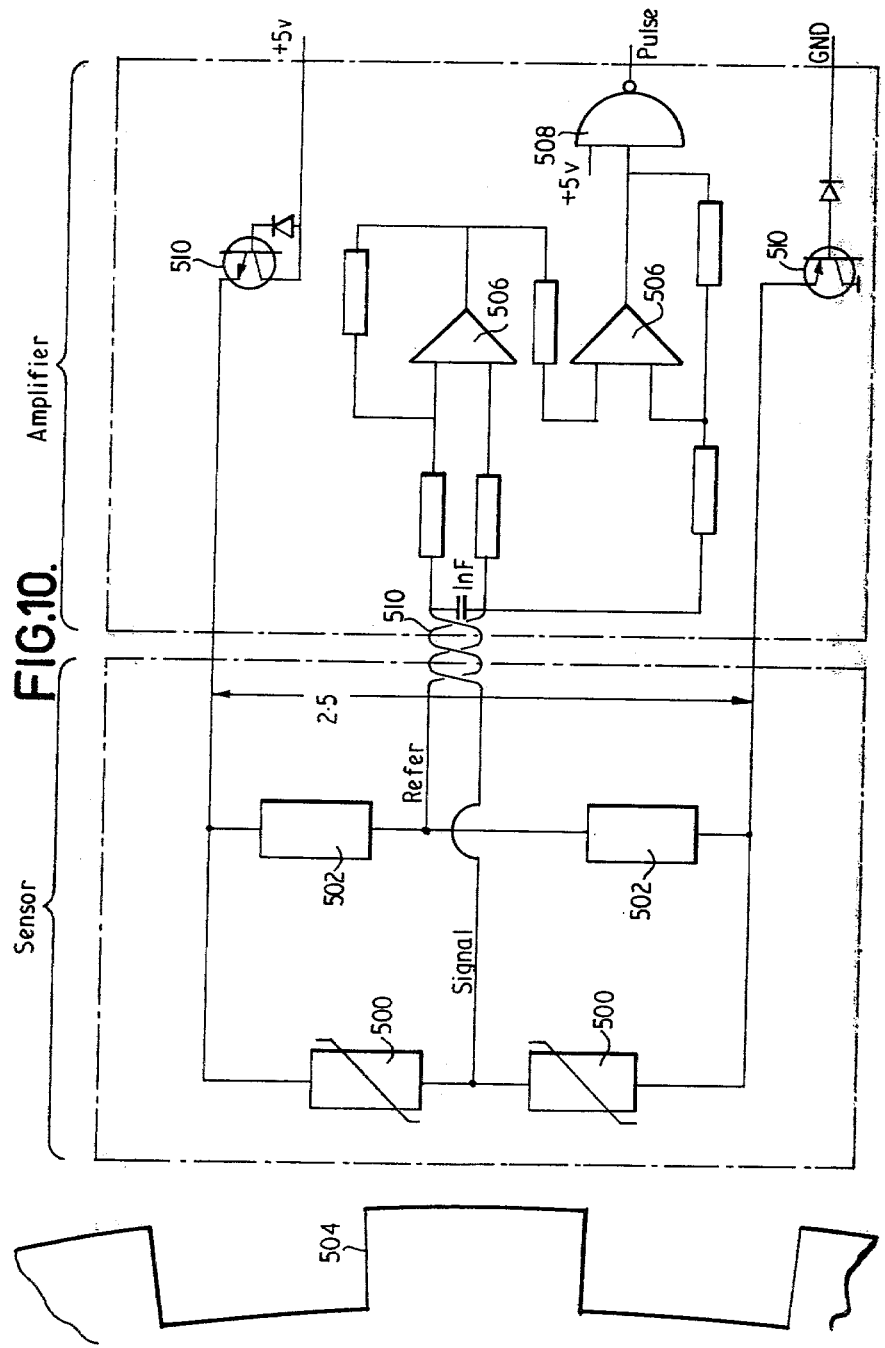

VEHICLE TRANSMISSION CONTROL SYSTEM

FIELD OF THE INVENTION

This invention is related to automatic and remote electronic control systems particularly adapted for use with the mechanical and hydromechanical transmissions of motor vehicles such as trucks, busses, oil tankers, earthmoving machines as well as transmissions for railway and military applications.

BACKGROUND OF THE INVENTION

Fully automatic systems which comprise combinations of hydraulic torque converter transmissions and complementary gears are well known in the art and common on the market. Although many of these systems have hydromechanical control systems, the increased demands for a system which is capable of varying the shift conditions in relation to a wide variety of factors, as well as the increased demand for inclusion of safety functions in the basic automatic systems, has resulted in the development of electronic contol systems for this purpose. An example of a system incorporating such electronic controls is that disclosed in commonly assigned U.S. Pat. No. 4,033,202.

While these systems, and similar systems, make it possible to tailor the operation to most conventional demands, such systems become large and quite complicated as the demands thereon increase. Further, such systems do not permit variations in the basic operating mode without a complete redesign and reconstruction of the system. Thus, the electronic autopilots or control systems of the type in question are not able to serve transmission units and assemblies which are of various forms and types, and which incorporate various accessories. Further, due to the complexity involved, such systems are normally limited to determining the drive connections in dependence upon primary speeds, secondary speeds and speed ratios only.

SUMMARY OF THE INVENTION

In accordance with the invention, a vehicle transmission control system is provided which affords substantial advantages in capacity and versatility as compared with prior art systems. The vehicle transmission control system of the invention comprises an electronic control system which is capable of taking into account, particularly speaking, a virtually unlimited number of input signals relating to the actual operating conditions of the vehicle transmission and the settlings of the controls therefor. The electronic control system senses the operating conditions, control settings, and/or other inputs to develop demand signals for automatically controlling the operation of the transmission in accordance with the input signals and the relationship therebetween. In addition, the system is capable of handling a wide range of demand signals including acceleration and/or deceleration signals. Moreover, the system is applicable to a wide variety of mechanical and hydromechanical motor vehicle transmissions, even including hydrostatic and hydrodynamic torque converters and provides automatic gear operation for both driving and braking. The system of the invention can provide for different modes of operation and adapt to different conditions and usages with minor, readily effected changes in the operating program. A further important advantage of the electronic control system of the invention is the substantial reduction in cost as compared with prior art autopilots. In addition to the obvious advantages thereof, this cost reduction permits the use of a standard control system with relatively small transmissions, i.e., auto transmissions, while still enabling the use of the same standard or basic control system with relatively large, complex transmissions such as those of high power military vehicles, locomotives and railcars. However, in general, the vehicle transmission control system is perhaps best adapted for use as part of the automatic transmissions of busses, trucks and the like, for both on-the-road and off-the-road applications.

In accordance with a preferred embodiment thereof, the vehicle transmission control system of the invention basically comprises an electronic control system for controlling the vehicle transmission by converting input signals thereto related to operating conditions of the transmission into output control signals for the transmission in accordance with a predetermined set of criteria. The electronic control system comprises means for sensing a plurality of transmission operating conditions and producing input signals, comprising pulses, in accordance therewith, microprocessor means for monitoring the states of the input signals, programmable read-only memory means connected to the microprocessor means, timing means connected to the microprocessor means for directly delivering clock pulses to the microprocessor means, output means, connected to the microprocessor and including latch means, for producing output control signals under the control of the microprocessor means, and addressing means for synchronizing the operation of the programmable read-only memory means and the latch means under the control of the microprocessor means. The electronic control system further comprises electro-mechanical operators, e.g., solenoid valves and/or relays, which are responsive to the output signals and which control the operation of the vehicle transmission accordingly.

Preferably, the electronic control system also includes random access memory means connected to the microprocessor means for storing the states of signals being monitored and enabling arithmetical operations to be performed on the stored signals states. The output means also include electrical switching means continuously controlled by the latch means, these electrical switching means advantageously comprising power transistors of a type having current limiting, power limiting, and thermal overload protection.

Preferably, a voltage/frequency converter is provided for converting at least one voltage input signal in a predetermined manner into a series of pulses to be fed directly to the microprocessor means. Advantageously, this voltage signal is controlled by a potentiometer. In addition, a multiplexer means is connected to the microprocessor means for providing an increased number of input signals which are directly fed to the microprocessor means. Advantageously, at least one delay circuit means, comprising one resistor, one capacitor, and one rectifier, is provided for delaying the change in at least one input signal and for limiting the level of that at least one signal. Further, at least one resistor-zener diode arrangement is preferably provided for limiting the current and voltage of at least one signal to be directly fed to the microprocessor means. A circuit arrangement, comprising one resistor, one capacitor, one rectifier, and one gate means, is also utilized to provide distinct starting signals to said microprocessor means.

In addition, a switch is employed for controlling the input signal to the at least one delay circuit means.

In a preferred embodiment, a motion sensing means is used to produce at least one of the input signals to the control system. The range of frequencies of the pulses produced by the motion sensing means preferably has the lower limit of zero Hz. The motion sensing means includes a magnetoresistive sensing arrangement and amplifying means, including at least one operational amplifier, for providing appropriate control signals. Advantageously, this magnetoresistive sensing arrangement is operated with a potential difference of no more than 3 volts and this potential difference is maintained by a separate voltage regulator. The magnetoresistive sensing arrangement preferably comprises a magnetoresistor connected in a bridge circuit together with a pair of fixed resistors such that a signal voltage is obtained across a connection between the two fixed resistors and a central terminal of said magnetoresistor. Where remote sensing is employed, the magnetoresistor and the amplifying means are connected together by a twisted-pair cable.

In an embodiment utilizing a motion or movement sensing means, the periodicity of processing the input signals by the microprocessor means to produce the output signals is primarily dependent upon the rate of acquisition of a predetermined number of digital input signals produced by the movement sensing means. This movement sensing means preferably comprising means for producing signals indicative of the transmission input and output shaft speeds wherein the time necessary for determination of the input and output shaft speeds is solely dependent upon the input shaft speed. Further, the output shaft speed is determined by performing arithmetical operations upon values solely relating to the input shaft speed and the ratio of output shaft speed to input shaft speed. Advantageously, the output shaft speed is determined by dividing a value, which is directly proportional to the speed ratio, by a value which is inversely proportional to the input shaft speed. As a result of the invention, the accuracy of determination of the output shaft speed is independent of the output shaft speed over the entire range of obtainable values.

In the preferred embodiment referred to, the microprocessor means controls the transmission in accordance with a predetermined program in relation to driving conditions of the transmission, and the input and output speeds, as well as signals related to the setting of a prime mover, are sensed and directly supplied to the microprocessor means. The system further includes buffer means connected to said microprocessor for receiving signals related to setting of the prime mover for the transmission as well as additional input signals. The electro-mechanical means preferably comprises solenoid valves for controlling the setting of the transmission, the input signals being processed in accordance with a predetermined program to produce output signals which are fed to said solenoid valves. Input signals related to the setting of the prime mover for said transmission can also be processed according to the program to control the operating conditions of the transmission. The prime mover preferably comprises an engine whose setting is utilized to influence, in a predetermined manner, a part of the program for controlling the operation of the microprocessor means so as to determine the shift points of the transmission. The movement sensing means in this embodiment comprises means for sensing output speed signals of the transmission, the microprocessor means processing the speed signals to obtain an acceleration factor and employing this factor in relation to the setting of the prime mover and the speed of prime mover in determining the transmission shift points.

Other features and advantages of the invention will be set forth, or apparent from, the detailed description of a preferred embodiment of the invention found hereinbelow.

BRIEF DESCRIPTION OF THE DRAWINGS

FIG. 4 and FIGS. 5(a) and 5(b) are diagrams of selected operating characteristics of a transmission incorporating the electronic control system of the invention, wherein FIG. 4 shows operating conditions of the transmission when the engine is applying tractive effort, and FIGS. 5(a) and 5(b) show operating conditions of the transmission under hydraulic braking conditions;

FIGS. 6a, 6b and 6c are consecutive parts of a chart setting forth the sensed and controlled parameters or conditions which interface with the microcomputer of the electronic control system of the invention;

FIG. 10 is a schematic circuit diagram of a motion sensing arrangement in accordance with a preferred embodiment of the invention.

DETAILED DESCRIPTION OF THE PREFERRED EMBODIMENTS

Figure 1:
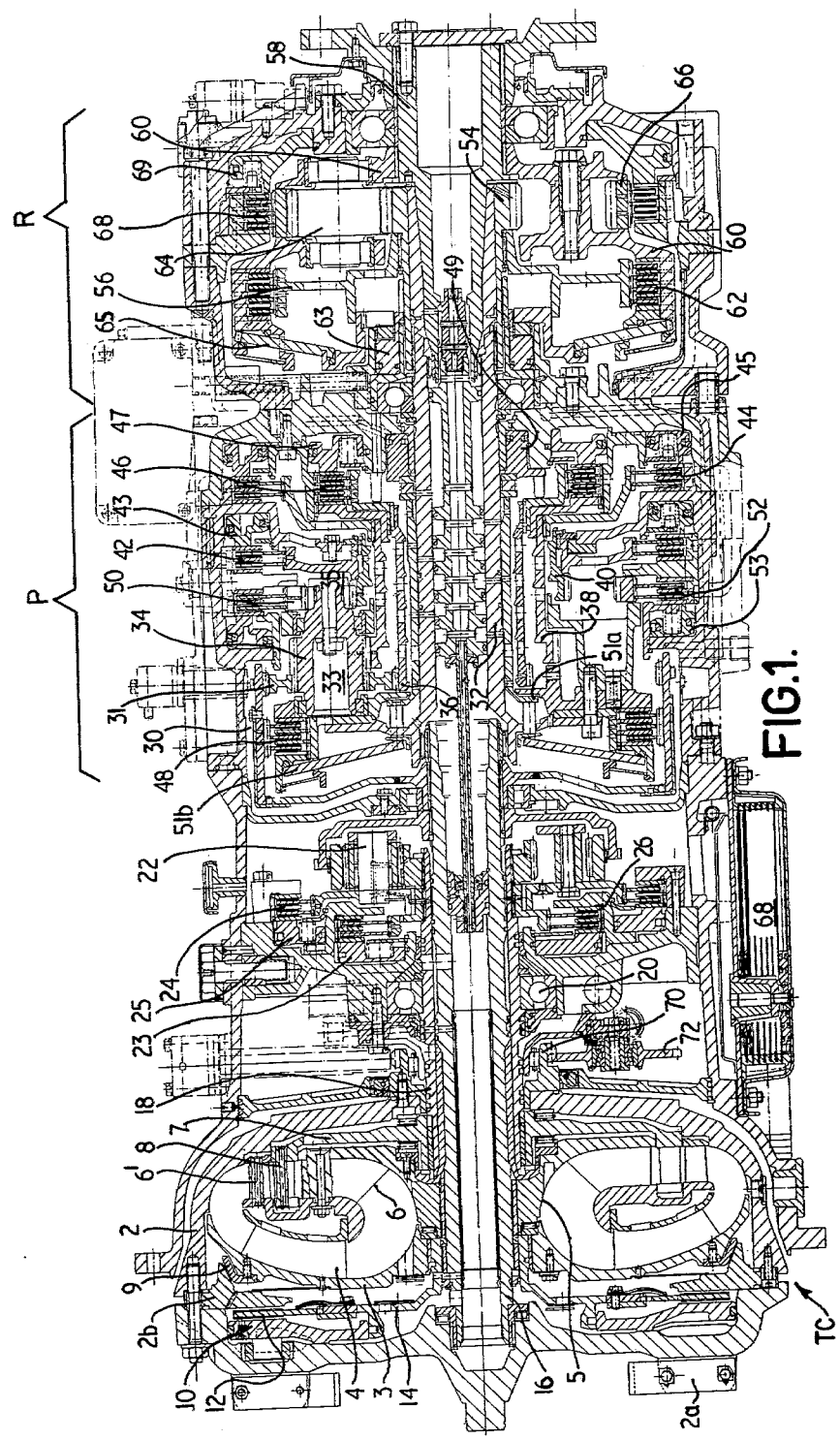
FIG. 1 is a longitudinal cross section of a transmission in which, in a preferred embodiment, the electronic control system of the invention is incorporated.

Referring now to the drawings, like elements are represented by like numerals throughout the several views.

FIG. 1 illustrates a hydromechanical transmission with which the electronic control system of the present invention can be used. At the left end of FIG. 1 there is shown a torque converter TC including a rotating casing 2 adapted to be driven by a vehicle engine or the like via abutment means 2a. Internally, the illustrated torque converter comprises a pump member 3 having a ring of pump blades 4 mounted thereon. The torque converter further comprises a turbine member 5 having a ring of turbine blades 6 mounted thereon and a guide vane 7 having a ring of guide blades 8 thereon, wherein said guide blades may be used as a turbine. Connected to the turbine member 5 is a hub 14 to the outer periphery of which is attached a friction disc 12. The rotating casing 2 includes an inward extension 2b located between the disc 12 and the pump member 3 and a servo piston 10 on the outer side of disc 12. The torque converter shown herein is of the releasable pump member type which is shown and described in detail in prior U.S. Pat. No. 3,893,551, issued July 8, 1975. In accordance therewith, the pump member 3 is movable to the left to engage the pump member 3 with the rotating casing at conical friction coupling 9 for hydraulic drive. In another mode of operation, pump member 3 is moved to the right, releasing coupling 9, and the servo piston 10 is actuated to urge disc 12 into frictional engagement with extension 2b for direct drive between the rotating casing 2 and the turbine member 5. The turbine member 5 and the hub 14 and drivingly engaged with the turbine shaft 16. The guide member 7 is mounted on a guide member shaft 18 which rotate relative to turbine shaft 16 and which is mounted to the stationary portion of the casing at bearings 20. Shaft 18 is connected via a hub and friction discs to a brake 26 operable by servo piston 23 for holding the guide member 7 stationary for "single rotation". Shaft 18 is further connected to a planetary gear 22, the carrier of which is connected to friction discs forming a part of brake 24 which is operated by servo piston 25, whereby the guide member rotates oppositely from the turbine member for "double rotation". Arrangements for braking the guide member for single or double rotation are well known, one example being shown in the prior U.S. Pat. No. 4,010,660, issued Mar. 8, 1977. In hydraulic drive, torque multiplication is provided via the guide member blades, and the output of increased torque via the turbine member to the turbine shaft 16. Double rotation with brake 24 actuated allows a much higher multiplication of torque, but over a smaller range of speed ratios, than does single rotation (engagement of brake 23) wherein speed ratio is defined as the ratio of turbine shaft speed to rotating casing speed. Torque multiplication decreases with increasing speed until it becomes advantageous to disconnect hydraulic drive, i.e. disconnect the conical coupling 9, and to actuate servo piston 10 to drive the turbine shaft 16 directly from the rotating casing 2 via elements 12 and 14.

The torque converter includes a heat exchanger 68 through which fluid is pumped by means of a gear 70 via an intermediate gear 72. A system including, in a torque converter, a heat exchanger of this type, together with a pump and the appropriate fluid lines, is shown in greater detail in prior U.S. Pat. Nos. 4,056,019 and No. 4,058,980, issued respectively on Nov. 1, 1977 and Nov. 22, 1977.

There is provided downstream from the torque converter, a mechanical gear transmission comprising a first portion P having four forward gear ratios and a reverse gear, and a second portion, R referred to as a "range gear" having either a 1:1 drive or a further gear reduction. A transmission having such a first portion P followed by a second "range" portion R is shown in greater detail in co-pending U.S. application Ser. No. 843,520, filed Oct. 19, 1977, in the name of Karl G. Ahlen, one of the inventors herein. This downstream mechanical gear is normally used during acceleration and also during braking for overspeeding the turbine.

The turbine shaft 16 is connected to a ring gear 30. The secondary or output shaft of this first portion is designated as 32. Ring gear 30 drives a planetary gear 34 having a plurality of sections including a large diameter section 31 splined onto an intermediate diameter section 33 with a smaller diameter section 35 to the right. Intermediate between sections 33 and 35 is a bearing means for mounting this planetary gear 34. Sections 31, 33 and 35 are respectively engaged with splines of sun gears 36, 38 and 40. Section 35 is further engaged with a ring gear 50 operating as a reverse gear. Sun gears 36, 38 and 40 are either relesed for free rotation or connected to the stationary portion of the casing via friction brakes 46, 44 and 42, respectively, which friction brakes are actuated by servo pistons 47, 45 and 43, respectively. Reverse gear 50 is selectively engaged with the casing via friction brake 50 which is actuated via servo piston 53.

Alternatively, ring gear 30 can be connected directly to the carrier of planetary gear 34 and hence directly to secondary shaft 32 by engagement of friction clutch 48, the latter caused by actuation of servo piston 49, this in turn urging member 51a to the left to turn lever 51b such that its upper portion moves to the right to engage clutch 48.

Shaft 32 extends toward the right in FIG. 1 into the second portion or "range gear" whereat it is drivingly engaged with an elongated splined member 54 which is drivingly engaged with both a hub 56 and planetary gears 64. The holder 60 of planetary gear 64 is drivingly engaged with a secondary gear 58 which is the output shaft of the entire transmission. Planetary gear 64 is engaged with a ring gear 66 which can be braked relative to the stationary portion of the housing by means of a friction brake 68 which is actuated by servo piston 69. This would permit a speed reduction between shafts 32 and 58. Alternatively, shafts 32 and 58 may be operatively engaged to each other via a hub 56 and friction clutch 62, the latter frictionally engaging hub 56 with the planetary gear holder 60. Friction clutch 62 is actuated via a servo piston 63 which acts via a lever system 65.

Figure 2:
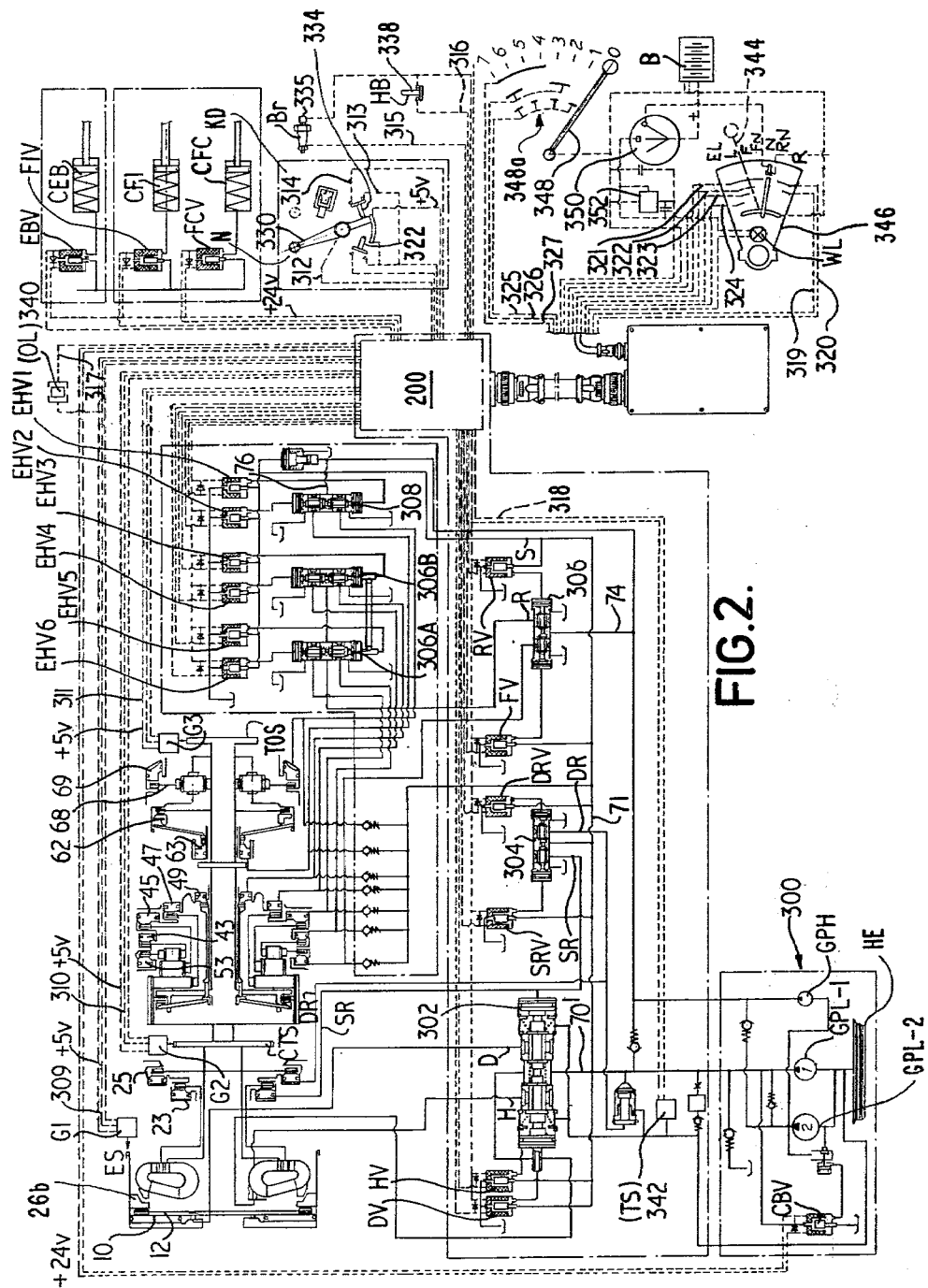
FIG. 2 is a schematic diagram of the essential components of the transmission of FIG. 1 together with the mechanical and electronic controls thereof.

Referring now to FIG. 2, there is shown an electrohydraulic-electronic control system in accordance with the present invention. In FIG. 2, mechanical connections are indicated in solid lines and electrical connections in dashed lines.

For convenience, the hydraulic systems contained within FIG. 2 will be described first. A pump system 300 includes a high pressure gear pump GPH and a pair of low pressure gear pumps GPL-1 and GPL-2, the pressure of which is controlled by a solenoid valve CBV. There is also included a heat exchanger HE as described in the previously mentioned U.S. Pat. No. 4,058,980. These pumps provide the pressurized oil to operate the valves of the system and the pressurized oil which flows through the valves to the various servo pistons and to the torque converter chamber. The system comprises a first valve 302 which controls the flow of fluid to the torque converter, a second valve 304 which controls the flow of fluid to single and double rotation servo piston 23 and 25, a third valve 306, which together with secondary valves 306A and 306B, controls the flow of fluid to the first portion of the mechanical transmission and lastly a valve 308 which controls the flow of fluid to the servo pistons 63 and 69 of the range gear. Oil under pressure is delivered from pump GPL-1 to the valve 302 for delivery to the torque converter, to all of the electric solenoid valves for delivery to the ends of all of said valves for moving same axially, and to the valve 304 for delivery to single and double rotation servo pistons 23 and 25. Oil under pressure is also delivered from pump 300 to the valve 306 and its secondary valves 306A and 306B for delivery to the servo pistons of the first portion P of the mechanical transmission.

Referring again to FIG. 2, and specifically to valve 302, it will be seen that the pressurized oil enters the valve at line 70'. With the spool of valve 302 in its neutral position, the torque converter is in its neutral position with neither the coupling 9 nor the disc 12 engaged with extension 2b of the rotating casing 2. Movement of valve 302 in one direction will then connect the pressurized fluid from line 70' to line H for hydraulic drive and movement of this valve in the other direction will connect such pressurized fluid with line D for actuation of servo piston 10 and hence direct drive. It is obvious, therefore, that one cannot place both lines H and D under pressure at the same time.

Turning to valve 304, pressurized fluid through line 71 will flow through either a first line SR of a second line DR, depending on the direction of movement of valve 304, to actuate either single rotation piston 23 or double rotation piston 25.

At valve 306, pressurized oil entering at line 74 is delivered either through line R to servo piston 53 or through line S to the two further valves 306A and 306B. Valve 306A has three positions including two end positions whereat the entering pressurized fluid is delivered to either servo piston 45 or servo piston 43. The third position is a neutral position whereat the fluid passes through valve 306A to valve 306B. The latter, in turn, has two positions, a first end position whereat this pressurized fluid passes through a line to servo piston 47 and a second position whereat this fluid passes through another line to servo piston 49.

Finally, valve 308 receives pressurized fluid from line 76. As this valve 308 is moved to its end positions this pressurized fluid is delivered to either servo piston 63 which operates friction clutch 62 or servo piston 69 which operates brake 68.

Thus, in summary, the hydraulic control valve system, including valves 302, 304, 306, 306A, 306B and 308, controls the flow of oil to the servo-pistons which directly engage the various brakes and clutches in the transmission of FIG. 1 as described above, with pressurized oil being obtained from the feeder pump system which is driven by the primary side of the transmission. The hydraulic valve system is, in turn, controlled by means of solenoid valves which are described below and which, through electrical signals, control the flow of oil actuating the various servo-pistons in the hydraulic valve system.

The system of FIG. 2 further includes an engine brake cylinder CEB, a fuel injection cylinder CFI and a fuel cut-off cylinder CFC which are controlled by solenoids EBV, FIV, FCV. These operators and their functions are conventional.

As mentioned hereinabove and shown in FIG. 2, the setting of the transmission is determined by a plurality of solenoid -type valves. These valves are indicated in FIG. 2 at DV, HV, SRV, DRV, FV, RV, and EHV1 to EHV6. These valves control, via the hydraulic valve system including valves 302, 304, 306, 306A 306B and 308, the flow of oil for (1) connection of direct drive or hydraulic drive, (2) single rotation drive or double rotation drive, (3) forward or reverse drive, (4) a first group of mechanical gears P, (5) a second group of mechanical gears P, (6) the range gear R, respectively. The solenoid valve CBV controls the bypass around low pressure pump GBL-2 and thereby controls the contribution of the output of that pump to the overall output of the pump system 300. In particular, solenoid valves DV and HV control valve 302, solenoid valves SRV and DRV control valve 304, solenoid valves F and R control valve 306, solenoid valves EHV1 to EHV6 control valves 306A, 306B and 308, while, as mentioned previously, solenoid valve CBV controls pump GPL-1. In addition, the further solenoid valves FIV, FCV, and EBV control the engine-influencing devices for fuel injection, fuel cut-off, and engine braking, respectively, as mentioned hereinabove. It should be noted that the arrangement of the solenoid valves illustrated in FIG. 2 is obviously not the only arrangement that can be used and, moreover, it is not necessary for the output signals derived from the system to control solenoid valves in that such signals can equally well be used in the control of signal lamps, relays, or other electrical devices. The solenoid valves are supplied from a microcomputer described herebelow by a common +24 V line connected to the vehicle battery B. Generally speaking, an individual solenoid valve is actuated by completing, through a power transistor in the microcomputer, a connection from that solenoid valve to ground. The valve system of the transmission is arranged so that a complete neutral setting is obtained (no clutches connected) when no solenoid valve is activated (the condition where, for instance, the vehicle ignition is off).

Figure 3:
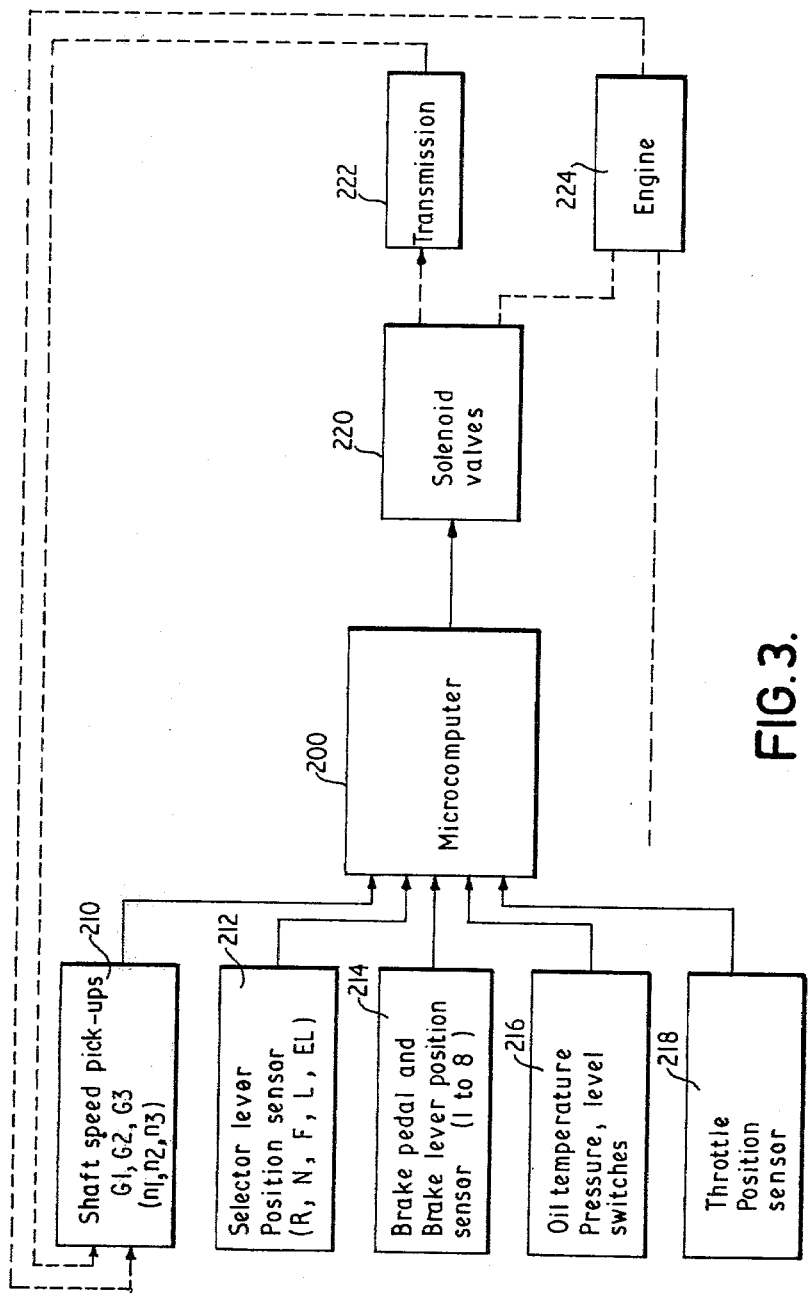
FIG. 3 is a block diagram of the basic units of the transmission control system of the invention.

Before discussing the input signals to the electronic control system and their origins, it may be helpful to briefly consider the overall electronically controlled transmission. Thus, referring to FIG. 3, the basic units of the overall system of the invention are illustrated. The heart of the electronic control system is a microcomputer 200, which, as shown, receives input signals from (i) shaft speed pickups, individually denoted G1, G2, G3 and collectively denoted 210; (ii) the selector lever position sensor 212; (iii) the brake pedal and brake lever position sensors 214; (iv) the oil temperature, pressure and level switches 216; and (v) the throttle position sensor 218. As noted, these inputs are described in more detail below. The output of microcomputer 200 controls the plurality of solenoid valves which were discussed hereinabove and which are collectively denoted 220. Solenoid valves 220, in turn, control the operation of the transmission 222 and the engine 224 as discussed hereinafter. As in FIG. 2, the dashed lines indicate electrical connections and, as shown, the speed signals are fed back from the engine and transmission so as to form inputs to microcomputer 200.

Turning again to FIG. 2, the input signals referred to above comprise shaft speed signals G1, G2 and G3 (see block 212 of FIG. 3) which appear on lines 309, 310 and 311, throttle position signals (block 218 of FIG. 3) which appear on lines 312, 313 and 314, brake pedal and handbrake signals (block 214 of FIG. 3) which appear on lines 315 and 316 respectively, oil level and temperature safety signals (block 216 of FIG. 3) which appear on lines 317 and 318, respectively; selector lever position signals (block 212 of FIG. 3) which appear on lines 319, 320, 321, 322, 323 and 324; and brake lever position signals (also block 214 of FIG. 3) which appear on lines 325, 326 and 327.

The shaft speed signals are square wave, TTL pulses consisting of two levels, viz., OV and +5 V. The pulses are obtained from the sensor/amplifier units G1, G2 and G3 disposed adjacent to gear teeth rotating with the engine shaft ES, converter turbine shaft CTS, and transmission output shaft TOS, respectively, as illustrated.

Considering the other input signals in more detail, the throttle position signals appearing on lines 312 to 314 are related to the position of the throttle lever indicated at 330 and these signals include a variable voltage between 0 and 5 V which is, proportional to the throttle position and which is provided by a potentiometer (not shown), the tap of which is attached to the throttle lever 330. Two further signals, indicating the terminal positions "throttle released" (or N) and "kickdown" (or KD), respectively, are obtained by use of contactors 332 and 334 which open or close connections to ground. When the contactors 332, 334 are in the open positions, the microcomputer holds the signal line at +5 V.

The brake pedal (Br) and handbrake (HP) signals on lines 315 and 316 are obtained in a same manner, i.e., through the use of contactors, indicated generally at 335 and 338, respectively, which provide openings or closing of a connection to ground.

The oil level (OL) and temperature safety (TS) switch signals appearing on lines 317 and 318 are provided by switches, indicated generally at 340 and 342, and are held at +24 V (the battery voltage) during normal operation. Excessively low oil level or high oil temperature cause the respective switch 340 or 342 to close a connection to ground, thus lighting a warning lamp WL on the instrument panel and simultaneously activating a delay circuit in the microcomputer. This delay circuit allows time for the driver to take some independent action before the microcomputer releases the transmission so as to prevent damage.

The selector lever and the brake lever are intended to be directly controlled by the driver through the autopilot 200. The signals are produced, as shown, by a number of switch contactors which control the completion of connections to ground, thereby providing for a combination of signals. The microcomputer 200 holds the signal lines at +5 V for an open connection. The selector lever is indicated in FIG. 2 in dashed lines at 344 and the contact plate at 346, while the six output lines 319 to 323 are respectively dedicated to the following driving settings: reverse (R), reverse neutral (RN), neutral (N), forward neutral (FN), forward (F), low (L), and extra low (EL). In the neutral (N) position, the transmission brakes are released and the turbine pump is released. In the forward neutral (FN) position, the DR brake (or possibly the SR brake) is applied. The turbine pump is released, so that free wheeling is provided and instantaneous vehicle stopping can be provided. In the forward (F) position, the turbine pump is engaged and this is the normal driving position. The other positions are self-explanatory. It will, of course, be understood that more and different settings can be provided as desired.

The brake lever, which is indicated at 348, uses lines 325 to 327 to indicate eight different braking levels by virtue of the pattern of switch contactors 348a illustrated. These brake lever input lines like those from the selector lever are connected to the microcomputer 200.

Again, it will be understood that the forgoing listing is not exhaustive, and the microcomputer 200 has a capacity to process many more of each of the different types of signals discussed.

The system is powered by the vehicle battery B which provides +24 V and the system ground. The battery B is connected to a voltage regulator 352 which provides a stabilized +5 V supply, the voltage regulator being located in the selector lever box or housing with an ignition switch 350 and serving to supply the microcomputer, the shaft speed signal amplifiers, and the throttle position potentiometer mentioned above. All connections to ground in the system are made through a common ground line, connected to the minus pole of battery B via the microcomputer 200.

Before discussing the details of the microcomputer 200, the operating characteristics of the overall system will be briefly considered. The full throttle performance characteristics of an engine-transmission unit as described above are shown in FIG. 4, including the characteristics for double rotation drive, single rotation drive, and direct drive together with the eight-speed gear. For sake of simplicity, the hydraulic drive characteristics are shown for the first four mechanical gear ratios only; however, all combinations are, of course, possible and the determination and control of these combinations (for all throttle positions) necessitates the use of the electronic control system according to the invention. In addition, the determination and control of transmission settings (including the influence of engine) during braking by overspeeding the turbine or variations thereof require such a control system. Braking by means of overspeeding the turbine is obtained for the transmission of FIG. 1 by releasing the direct clutch friction disc 12, and connecting the releasable pump 3 as well as the single rotation brake 26 when the speed ratio as defined above is greater than unity. This condition is achieved by providing for a gear ratio in the mechanical gear which is lower than what would normally be provided. Reference is made to copending, common assigned application Serial No. 3,526, filed on even date herewith, entitled "Braking Method for Vehicle Transmission" for a further description of this braking technique. In any event, the direction of the flow of power in the transmission is thus reversed, thereby producing a retarding effect. The characteristics of the retarding function are shown in FIGS. 5(a) and 5(b), where modulation of the amount of braking is achieved in part by influencing the engine, by means of pressurized air devices, vacuum devices, electro-magnet devices, or other electrical devices, which devices are energized by means of electrical signals. FIG. 5(b) shows other variations of hydraulic braking, where either the pump member 3 or the single rotation brake 26 is relased, that is, free to rotate. These variations also produce a retarding effect which is modulated by influencing or controlling the engine as described above.

Referring to FIG. 6, a diagram is provided which indicates the driving conditions, remote control settings, automatic contactors related to manual settings, shaft speed signals, values calculated in microcomputer, output signals, and so on. This diagram is included as an aid in understanding of the operation of the system of the invention in connection with the description of the autopilot or microcomputer 200. However, it should be noted that FIG. 6 is not suitable for showing shift points between different driving conditions in that the relationships between primary conditions and secondary conditions are normally variables. FIG. 6 shows the level of complexity of the problem to be solved, especially for a high performance transmission. In this regard, FIG. 6 is not intended to describe in detail the programming of the autopilot of the invention for the special applications in question, but rather to show that the autopilot is capable of solving the problem of converting input signals to suitable output signals for the type of transmission in question.

Considering FIG. 6 in more detail, and referring to driving conditions set forth at the left side of FIG. 6, condition No. 1 is the setting for forward drive wherein the guide member 7 of the torque converter TC is connected for single or double rotation drive and the turbine shaft 16 is connected via mechanical gear transmissions P and R to the output shaft 58. For this particular transmission the guide member 7 would be connected for single rotation drive via planetary gear 22 to the turbine shaft 16 and the turbine shaft 16 would then be connected over mechanical gear transmissions P and R to the output shaft 58 for driving the vehicle. Obviously for purposes of normal starting, the lower gears of transmissions P and R would be connected. For this specific transmission, the pump member 3 of the torque converter TC would not yet be connected. This is to avoid drag torque and to prevent load on the engine when the vehicle is stopped. The pump member 3 is then connected to the rotating casing 2 via coupling 9 at the moment when the throttle is set to increase engine speed, and at this time the transmission passes from condition No. 1 to condition No. 2. The reason why the pump member 3 is the last connection in the row of transmission connections to be actually engaged is that, with the transmission described herein, this arrangement will avoid connection shocks by avoiding circulation of fluid in the torque converter chamber. Upon connection of the pump member 3 such fluid circulation then commences, whereby torque multiplication builds up. Hence, connection of the pump member 3 constitutes the transition between driving conditions No. 1 and 2.

Figure 4:
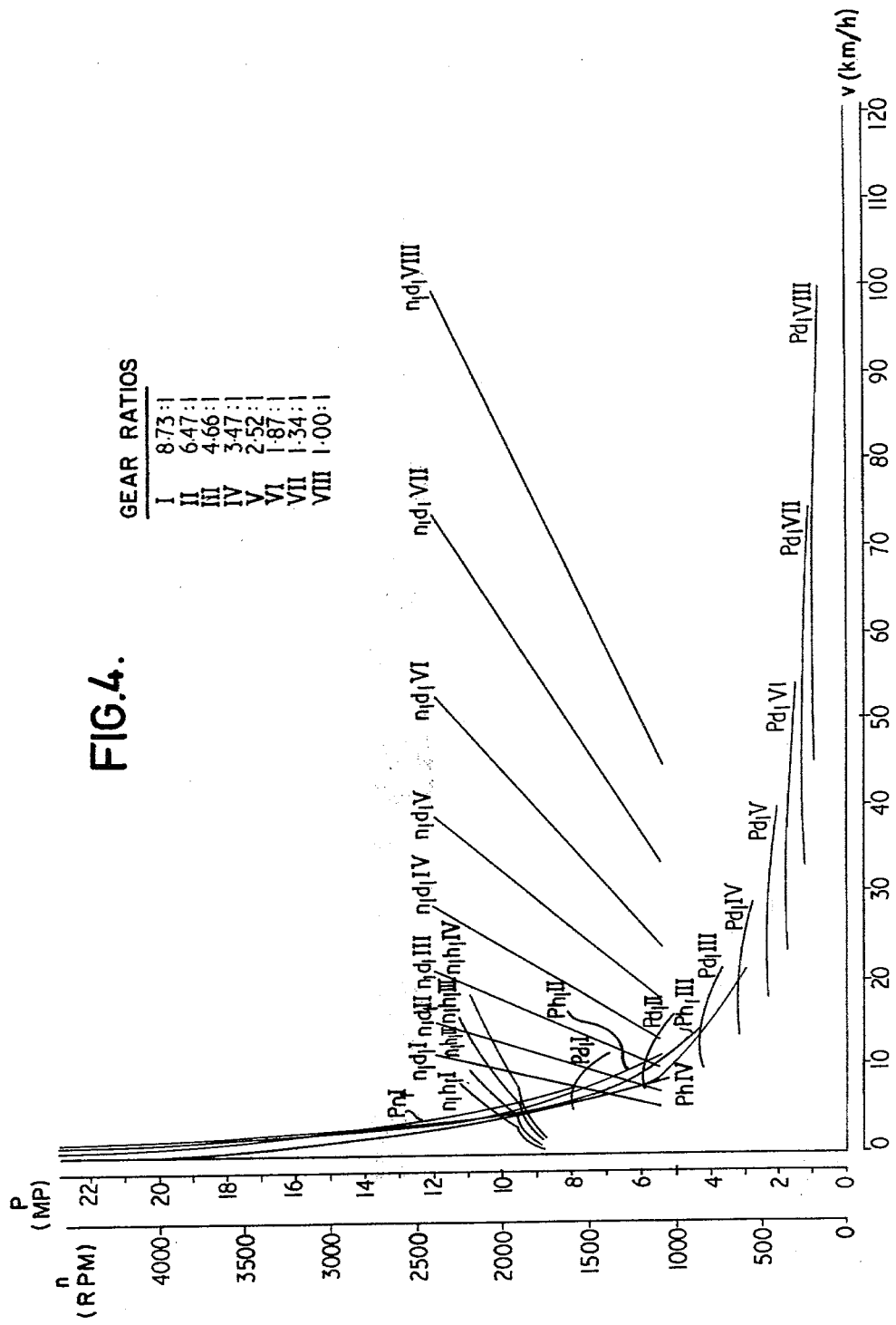

It will be understood that mechanical transmissions P and R provide eight forward gear steps as shown schematically and numerically on FIG. 4. The first four gear steps are of course the four forward gear ratios in mechanical transmission P with the brake 68 of the mechanical range gear R connected to the stationary casing, thereby providing a reduction gear ratio through the mechanical transmission R. The next four gear steps V through VIII again comprise the same four gear steps of mechanical transmission P, but this time with the input to mechanical range gear transmission R connected directly to the output shaft 58 via engagement of brake 62.

Depending on how hard the throttle is pressed, one will have different tractive efforts. If the throttle is pressed down to maximum, then one achieves the tractive effort illustrated in FIG. 4 at curve PhI. However, normally, the vehicle accelerates faster than the engine in the low gears, and therefore this high tractive effort is not actually obtained except when climbing extremely high grades. When, however, the vehicle has accelerated to a certain point in relation to the engine speed, then the guide member 7 is disconnected from the turbine and connected to the stationary casing, i.e. brake 24 is released and brake 26 is engaged, which of course comprises normal single rotation drive. This then is driving condition No. 3 of FIG. 6. This condition remains until the point is reached whereat direct drive is required, at which point coupling 9 is disengaged, freeing the pump member 3 from the rotating casing and piston 10 is then activated to engage the disc 12 against the extension 2b of the rotating casing 2. This of course, is driving condition No. 4. The point at which the transition from condition 3 to condition 4 occurs is related to the throttle-pedal position which will be at different speed ratios between the pump member and the turbine member after the vehicle has accelerated sufficiently. In first gear the vehicle can now accelerate up to about 12 km/hour and the tractive effort is represented by the curve $Pd_iI$ in the case of maximum throttle. Normally the first two or three gear steps of the mechanical transmission P and R are used only for staring under severe conditions or for driving fully loaded up very high grades. Normally, therefore, the automatic control means may have already connected up to the fifth gear or possibly up to the eighth gear before there arises the need for applying some type of retardation.

Condition No. 5 of FIG. 6 represents conventional hydraulic braking wherein, at the torque converter, the direct drive is connected and the guide member 7 is held fixed to the stationary casing or at lower vehicle speeds the guide member 7 can be connected to the turbine at brake 24 (again, with direct drive connected) thereby making the guide member rotate backwards.

While this conventional type of braking is satisfactory, it does not provide the ability to modulate the braking except by connecting different gears. Therefore, in lieu of this conventional braking, with the present system it is possible to provide a hydraulic braking by overspeeding the turbine, having disconnected the direct drive connection. According to this arrangement, the automatic control means must connect a gear for a certain overspeeding of the turbine as shown diagrammatically in FIGS. 5(a) and 5(b). In FIG. 5(a) the lines marked $n_2$ with the indices I-VIII indicate turbine speeds, and the areas marked P with indices I-VII indicate the retardation force obtainable, the lower limits of the obtained retardation force being with a released guide member and with the engine running due to torque transmitted from the turbine member to the pump member. These lower limits of FIG. 5(a) are represented in FIG. 5(b) by the line Ph I-IIIc' for three different gear ratios, and the upper lines in FIG. 5a are represented in FIG. 5(b) by the lines marked Ph I-IIIa'. There is a difference, however, in FIG. 5(b) wherein the lines relate to constant braking torque on the engine by compression braking or the like and the speeds of the engine in FIG. 5(b) are in accordance with the dot-dash lines marked $n_1$I-IIIa-c. FIG. 5(b) is the more theoretical diagram while FIG. 5(a) shows the limits of retardation force obtainable by controlling the connection of gear ratios in relation to speed and engine speed, also taking into consideration the temperature of the transmission, etc.

Referring again to FIG. 6, driving condition No. 6 shows how under acceleration or retardation, direct drive at the torque converter can be released, for example, by pressing the throttle pedal down to a lower position, meaning of course a return to hydraulic drive, or possible a disconnection of the direct drive simply to avoid the engine speed being reduced below idling.

Condition No. 7 illustrates that it is possible, when coasting, to release both the torque converter direct drive and the pump member 3 to diminish the retardation force otherwise obtained when driving the engine.

The type of transmission described herein permits such functions as described hereinabove because the provision of a releasable driving member at the torque converter permits soft reconnections which can be automatically obtained. Under these conditions, freewheeling is not dangerous.

Finally, driving condition No. 8 merely represents connecting the reverse gear for driving in reverse.

Reading across the top of FIG. 6 there is set forth types of signals and calculations which can be utilized in control of the vehicle transmission. These include Group I "contactors" i.e., solenoid switches, (columns 1–4), Group II "automatic contactors relating to manual settings", i.e., switch contacts which are completed responsive to a manual setting, (columns 5–9), Group III, "pick-up input signals and automatic signal", i.e., speed and safety signals and the like, (columns 12-16), Group IV, "manuever signals" (columns 19-26) and finally a group entitled "position and/or conn. signals M4+M2 or M4+U+M2" (columns 30-37).

The obtain automatic control, it is first of all necessary to have manually set contactors such as are represented by Group I, wherein, for example, column 4 represents the connection of reverse which obviously is the result of a manual setting. For the exemplary transmission under consideration, reverse connection of the mechanical transmission gears and connection of the guide member is represented by column 3, and the difference between columns 3 and 4 is simply the movement of the throttle pedal. Connection for forward drive is represented by columns 1 and 2.

It will be obvious that columns 1-4 of Group I are related to driving conditions. For controlling the transmission, there must also be a number of contactors (and thus signals produced in response to the closing of these contactors) which are actuated automatically in response to throttle, hydraulic braking setting and hand brake setting, these being represented by columns 5-9. These signals also are related to the driving conditions but are automatically set and utilized in the electronic control system to prevent "erroneous" driving conditions or to influence driving conditions. Group III, in columns 12-16 illustrates digital signals necessary as a basis for deciding the setting of the transmission such as signals related to input and output speeds and to the condition of safety devices for controlling temperature and oil level (columns 15 and 16). As described elsewhere these signals can be utilized automatically to disconnect the transmission in the event of conditions such as too high a temperature or too low an oil level.

Group IV represents items to be calculated in the computer based on the input signals, for example, the ratios of speeds $n_2/n_1$ or $n_3/n_1$, or the acceleration corresponding to the speed $n_2$. In mode of operation, the acceleration is then compared with the throttle position (column 7) and the primary speed (column 12). Obviously this description covers only a sampling of the innumerable values which can be determined. As a result of these calculated values in relation to the manner by which the automatic control means is programmed, different output signals according to Group V, maneuver signals and gear connection signals, the points on columns 19-26 and 30-37 can be obtained.

Turning now to a further consideration of the microcomputer which controls the settings of the various solenoid valves on the basis of the input signals described above, the details of the microcomputer are illustrated in FIGS. 7 and 8(a) to 8(d). In an exemplary preferred embodiment, two circuit cards are used, a CPU card (FIG. 7) and an "Input/Output" card (FIGS. 8(a) to 8(d)). Briefly considering these cards, the CPU card contains the microprocessor and timing circuitry, capacity for up to 4096 bites of programmable read only memory (PROM) and 32 bites of random access memory (RAM), all of the addressing circuitry for the various components in the microcomputer and input buffers allowing the sensing of the state of twelve different contactors which either open or close a connection to ground. The "Input/Output" card contains sixteen power transistors which directly control the sixteen solenoid valves described below, two output latches which hold the signals controlling the state of the power transistors, a voltage/frequency converter which transforms the voltage indicating throttle position into TTL pulses the frequency of which is porportional to throttle position, a delay circuit for the "safety" signals, and three circuits which guard against overloading of the shaft speed signal lines described above. It is noted that the arrangement of components on the two cards has been chosen so that the CPU card will be identical for all applications envisioned, whereas the "Input/Output" card will contain only those components needed for a specific application. There is, of course, nothing which would prevent placing of all the components on one card, or distributing the various components on more than two cards.

Figure 7:
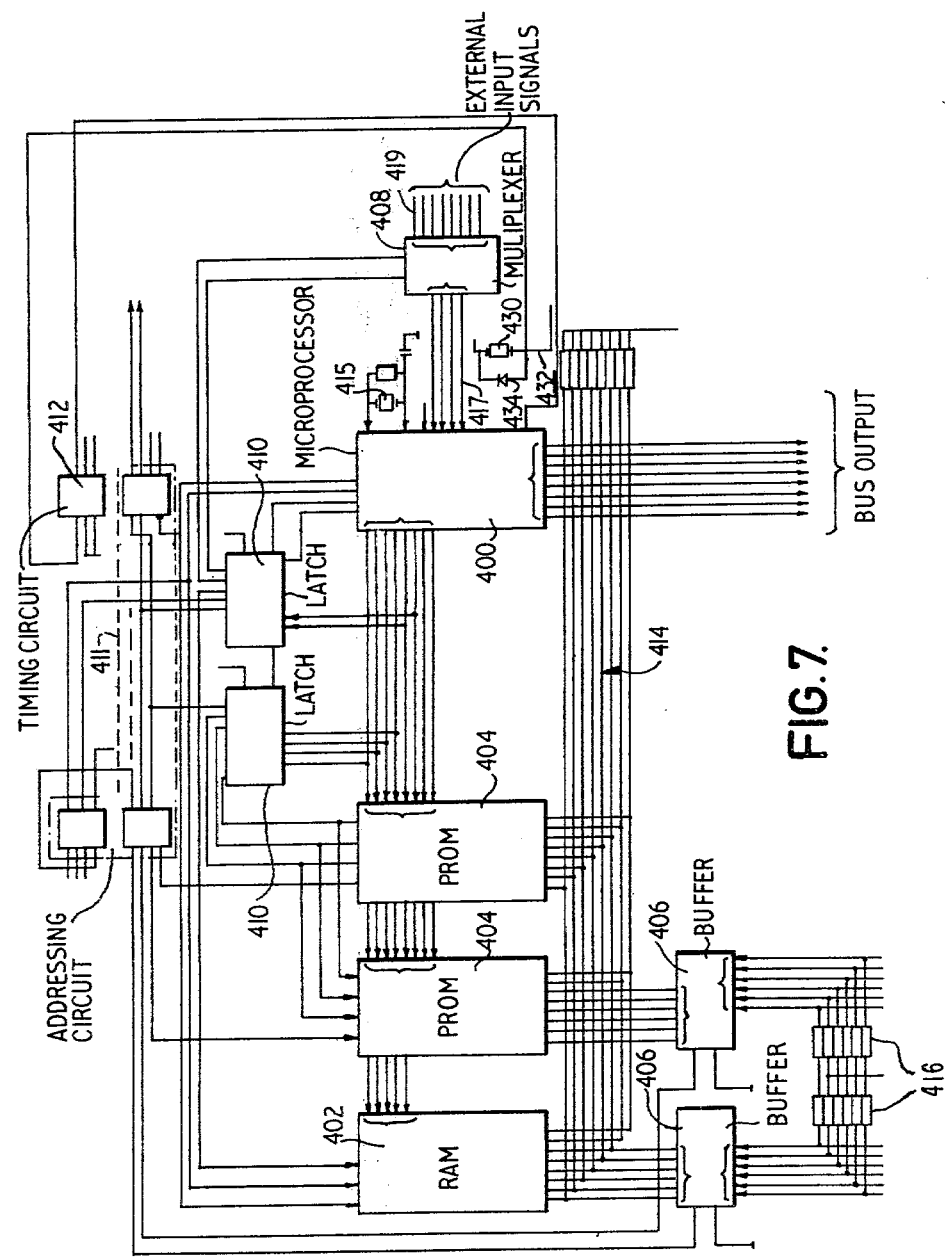
FIG. 7 is a schematic circuit diagram of the central processing unit of the microcomputer of the invention.
Figure 8:
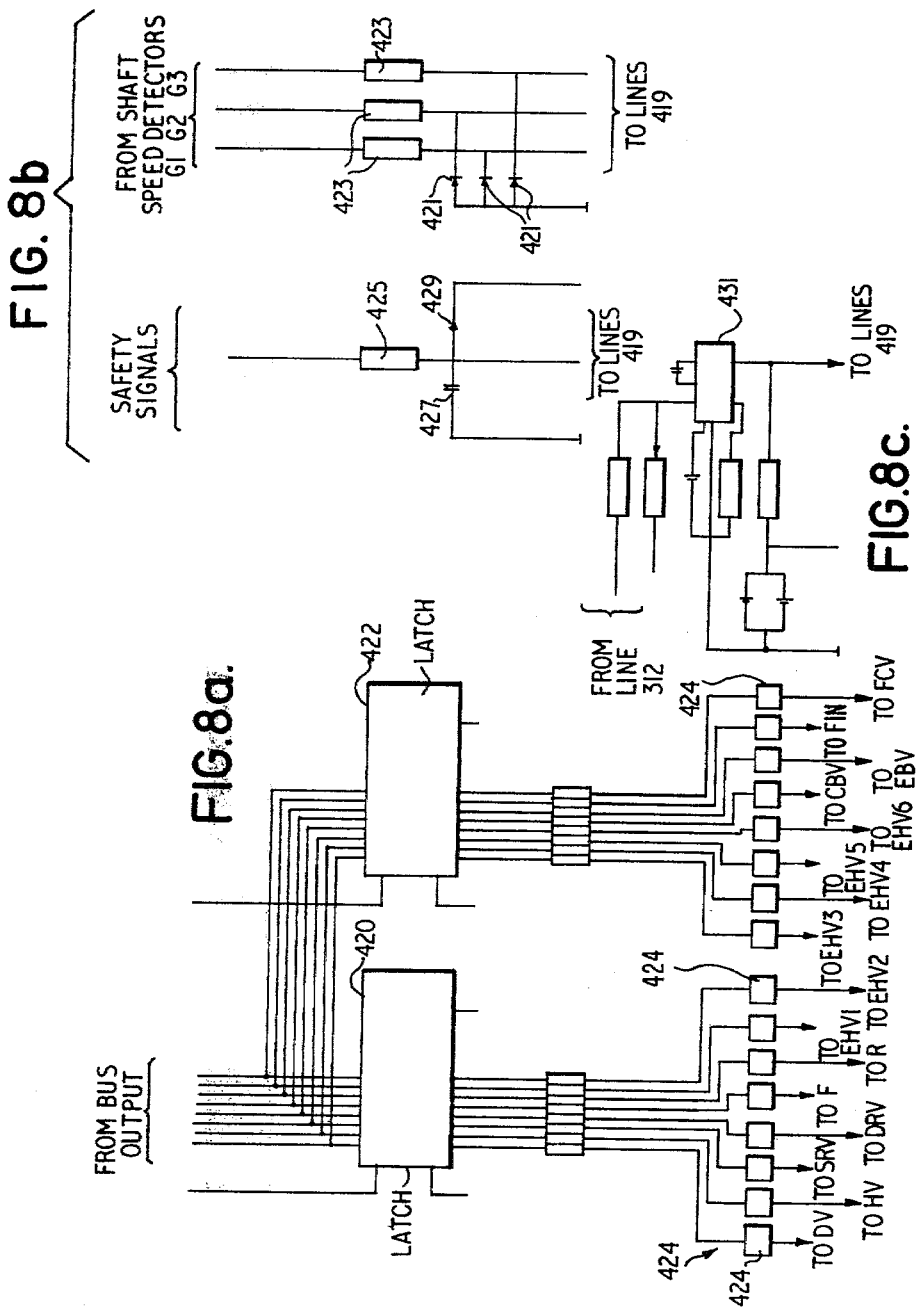
FIGS. 8a-8d show input and output circuitry utilized with the central processing unit of FIG. 7.

Considering the CPU circuitry in more detail and referring to FIG. 7, the basic components of the central processing unit are a microprocessor 400, a random access memory (RAM) 402, one or two programmable memories (PROMs) 404 (two being provided in the embodiment under consideration), a pair of hex inverting buffers 406, a multiplexer 408, a pair of latches 410 which are used in the decoding process, and addressing circuitry 411 and timing circuitry including decoder 412 and crystal 415. Similarly, the output circuitry for processing the CPU output is illustrated in FIG. 8a and basically comprises a pair of latches 420 and 422 and sixteen power transistors collectively denoted 424.

Microprocessor 400 controls the flow of date on eight input data lines, referred to collectively as a data bus and denoted 414. This data flow is to and/or from the memories 402 and 404, input buffers 406 and output latches 420, 422. Microprocessor 400 also directly senses the state of external signals (such as the shaft speed pulses, safety signals, throttle position pulses described above), and internally performs arithmetical and logical operations on these data, specifically on the basis of these data. This processing of the data by microprocessor 400 is controlled by storing an ordered set of date, i.e., a program, in the programmable read only memories 404 which program will be input, via the data bus 414 to the microprocessor 400 in the course of the normal operation thereof and will be understood by the microprocessor as being a set of coded instructions. The microprocessor 400 understands 256 different codes (corresponding to the 256 different possible permutations of the states of the eight lines in the data bus) and takes a specific and unique action in response to each of these instructional codes. It is noted that not all of the data input on the data bus 414, and in the PROMs 404, is instructions, and the data input may also include data intended to be processed according to the "instructions", or data to be input or output to and/or from the random access memory 402, input buffers 406, or output latches 420, 422. As will be readily apparent to those skilled in the art, the program is thus a series of instructions and data bytes which control the operation of the microprocessor 400, and thereby all of the other microcomputer components. The program which provides for controlling the engine-transmission unit on the basis of the input signals referred to above is described in general terms hereinafter.

Timing circuitry, including a 2.0 MHz clock 415, times the operations of the microprocessor. Most of the instructions used are executed in 8 μs (the other instructions take 12 μs to execute), thus permitting about 125,000 instructions to be executed each second. This arrangement also makes it possible to determine time periods very accurately, a feature which is effectively exploited in determining the frequency of, for instance, the shaft speed pulses. The 32 bytes of random access memory (RAM) provided by memory 402 are used to store variable information which can be retrieved to perform logical and arithmetical operations. RAM 402 is used partly as an extension of the internal variable storage of microprocessor 400, although the basic use is as a complement to the microprocessor 400, thereby allowing full useage of the microprocessor instruction set. In the present embodiment, this provides the capability of performing arhithmetical operations (viz., multiplication and division) between variable values. In many microprocessors, this capability is included as a part of the microprocessor itself.

The two hex-inverting input buffers 406 are used to sense the state of the various contactors which, as noted above, either open or close a connection to ground. Resistors 416 connected between the input lines and the +5 V line hold the input line at +5 V when a respective contactor is open. When the contactor is grounded, the input lines is held at 0 V. Because the buffers 406 are inverting buffers, a signal which is grounded by the corresponding contactor will be presented at the data bus 414 as +5 V signal when input is demanded by the microprocessor 400. Likewise, an open contactor will produce a signal of 0 V on the data bus 414.

The output latches 420, 422 shown in FIG. 8a store the eight signal levels of the data bus 414 when each is addressed by the microcomputer 400, and hold those signals until again addressed. In the latter case, the contents of the data bus will then be stored. These two level (0 or +5 V) logic signals are then used by output latch 420 or 422 to control the state of the eight power transistors 424 connected to that output latch. As noted above, these power transistors 424 are located within microcomputer 200. Thus, a latch output of +5 V on an input line causes the respective power transistor 424 to close or complete a connection between ground and the output signal line which connected to a corresponding solenoid valve. Similarly, a latch output of 0 V causes the power transistor 424 to open its connection. The individual connections between particular transistors and the solenoids controlled thereby are indicated in FIG. 8a.

The power transistors 424 referred to above and shown in FIG. 8a are chosen to have short switching times as well as the additional features of internal current limiting, power limiting, and thermal limiting projection making them virtually impossible to damage from any type of overload. In addition, transistors 424 are mounted on the card in such a way as to facilitate their cooling by means of externally mounted conduction/convection arrangements (not shown).

The latching circuits 410 and the addressing circuits 411 are used to decode the signals produced on the address lines by the microprocessor 400, these signals indicating the component to which the microprocessor 400 intends to send data or from which it expects to receive data. The address, together with the appropriate read or write signal from the microprocessor 400, is decoded to produce a unique signal for activating one and only one of the microcomputer components described above, i.e., memories 402, 404, input buffers 406, or output latches 420, 422.

The multiplexer 408 is controlled directly by the microprocessor 400 and enables the microprocessor to directly monitor, on lines 419, the state of up to eight external signals such as the shaft speed pulses, throttle position pulses, or delayed safety signals. These external signals do not use the data bus, but instead are connected directly to the microprocessor 400 via four lines 417 for which special instructions are provided. The switching of the input lines as provided by multiplexer 408 enables monitoring of any number of such signals.

Before some of the signals on lines 417 are directly inputted to the microprocessor 400, certain steps are taken to limit and transform the signals prior to the arrival thereof at the microprocessor 400. As shown in FIG. 8b, protection of the shaft speed signals against overload is provided by means of zener diodes 421 which open at 4.7 V. Series resistors 423 are also included. Further, the safety signals referred to above are reduced from +24 V to +5 V by the circuit shown in FIG. 8b which comprises resistor 425, capacitor 427 and diode 429. Finally, the throttle position voltage from the potentiometer (not shown) connected to line 312 (see FIG. 2) is converted by a voltage-to-frequency converter 431, and the associated circuitry illustrated, into TTL pulses having a frequency of between 500 Hz and 1500 Hz, the precise frequency being proportional to the actual throttle position.

The specific components used on the two cards in a specific embodiment are as follows:

| Reference Numeral | No. | Manuf. | Model No. | Description |
|---|---|---|---|---|
| | | | CPU Card | |
| 400 | 1 | RCA | CDP 1802 | Microprocessor |
| 402 | 1 | RCA | CDP 1824 | 32-byte random access memory (RAM) |
| 404 | 1 or 2 | INTEL | B 2716 | 2048-byte programmable read only memory (PROM) |
| 415 | 1 | 2,0 MHz clock crystal | | |
| 410 | 2 | Motorola | MC1404sBCP | Quad D Latch |
| 411 | 1 | " | MC14555BCP | Dual 1 of 4 decoder with active high outputs |
| 411, 412 | 1 | " | MC14556BCP | Dual 1 of 4 decoder with active low outputs (one half each) |
| 408 | 1 | " | MC14519BCP | Quad two input multiplexer |
| 406 | 2 | " | MC14502BCP | Strobed hex inverter/buffers |
| | | | Input/Output Card | |
| 420, 422 | 2 | Motorola | MC14508BCP | Dual 4-bit Latch |
| 424 | 16 | National Semiconductor | LM395T | Power transistors |
| 431 | 1 | Analog Devices | | | the magneto-resistors 500 and thus use with a higher allowable ambient temperature, an important feature in many applications, including applications utilizing the transmission of FIG. 1. The voltage regulating arrangement may be located anywhere in the system, but is included in the preferred embodiment as a part of the amplifier since, in large scale production, the amplifying circuits together with the voltage regulating circuits will be integrated on a signal circuit chip or board to be located in the vicinity of the sensor.

The accurate determination of output shaft speed over the entire operating range and within a time period that is entirely dependent upon input shaft speed (i.e., independent of output shaft speed) is central to the effective operation of the autopilot of the invention. This determination is accomplished in the microcomputer by directly determining a value which is inversely proportional to the input shaft speed and by counting the number of output shaft pulses received by the microprocessor during the time that a predetermined number of input shaft pulses are received by the microprocessor. In this way a signal is produced having a value which is directly proportional to the ratio of output shaft speed to input shaft speed. This speed ratio can be accurately determined over the entire operating range of the transmission because, as noted, the sensor/amplifier arrangement of FIG. 10 has no lower frequency limit and a sufficiently high upper limit. The output shaft speed is then calculated from the above-mentioned values by dividing the value directly proportional to the speed ratio by the value inversely proportional to the input shaft speed. This operation results in a value which is directly proportional to the output shaft speed, which is obtained in a time which is independent of that speed, and which has an accuracy that is also independent of the output shaft speed. This overall process is controlled directly by the program, making it possible to obtain any desired accuracy in determining the shaft speed or speed ratio. This method of calculation is, however, dependent upon the construction of the microcomputer system as described above.

The operational reliability of the entire system is dependent upon minimizing the time necessary to complete a cycle resulting in an outputted set of signals, without sacrificing accuracy in the various measurement and, in particular, the determination of the transmission output shaft speed. This is accomplished in the system described above by programming the microcomputer in such a way as to make the cycle time almost entirely dependent upon engine speed since the latter cannot fall below a certain idling speed. This capability depends upon the construction of the entire system as described above. Thus, the microprocessor 400 should have the capacity for directly monitoring pulse type signals; further, the capability of performing arithmetical operations must be present, the capacity for measuring very slow shaft speeds must be provided, and the output system must be constructed in the manner described above. When the system of the invention is constructed in this way other additional advantages and features are made available. Among these features is the ability to compute vehicle acceleration on the basis of known speeds and successively stored time differences and to relate this to the engine setting, by means of a potentiometer-voltage/frequency converter arrangement such as described above for producing pulses which are directly monitored and measured by the microprocessor 400, in order to determine the vehicle load and grade to be used in selecting a specific set of predetermined shift criteria which are then used to determine the transmission setting.

Although the invention has been described with respect to an exemplary embodiment thereof, it will be understood that variations and modifications can be effected in this embodiment without departing from the scope or spirit of the invention.

We claim:

1. A vehicle transmission system comprising, in combination, a vehicle transmission and an electronic control system for said transmission for converting input signals thereto related to operating conditions of the transmission into output control signals for said transmission in accordance with a predetermined set of criteria, said electronic control system comprising means for sensing a plurality of operating conditions of said transmission and for producing digital input signals in accordance therewith, microprocessor means for directly monitoring the state of said digital input signals, programmable read-only memory means connected to said microprocessor means, timing means for directly delivering clock pulses to the microprocessor means, output means, connected to said microprocessor means and including latch means, for producing output control signals for said transmission, addressing means for coordinating the operation of said programmable read-only memory means and said latch means under the control of said microprocessor means, random access memory means for storing the states of signals under processing and enabling arithmetical operations to be performed with said stored signal states and electro-mechanical means for controlling the operation of said transmission in accordance with said output signals, said programmable read-only memory means storing a series of coded instructions for repetitively controlling the operation of the said microprocessor means such that, on the basis of said input signals, said output signals are produced and transmitted to said electro-mechanical means.

2. A vehicle transmission system comprising, in combination, a vehicle transmission and an electronic control system for said transmission for converting input signals thereto related to operating conditions of the transmission into output control signals for said transmission in accordance with a predetermined set of criteria, said electronic control system comprising means for sensing a plurality of operating conditions of said transmission and for producing digital input signals in accordance therewith, microprocessor means for directly monitoring the state of said digital input signals, programmable read-only memory means connected to said microprocessor means, timing means for directly delivering clock pulses to the microprocessor means, output means, connected to said microprocessor means and including latch means, for producing output control signals for said transmission, addressing means for coordinating the operation of said programmable read-only memory means and said latch means under the control of said microprocessor means, and random access memory means for storing the states of signals under processing and enabling arithmetical operations to be performed with said stored signal states, said sensing means including movement sensing means for sensing the movement of at least one part of said transmission and for producing at least one of said digital input signals in accordance therewith.

3. A vehicle transmission system according to claim 2 in which the periodicity of the processing of said input signals by said microprocessor means to produce said output signals is primarily dependent upon the rate of acquisition of a predetermined number of digital input signals produced by said movement sensing means.

4. A vehicle transmission system according to claim 3, wherein said movement sensing means comprising means for producing signals indicative of the transmission input and output shaft speeds and wherein the time necessary for determination of the input and output shaft speeds is solely dependent upon the input shaft speed.

5. A vehicle transmission system according to claim 4 wherein the output shaft speed is determined by performing arithmetical operations upon values solely relating to the input shaft speed and the ratio of output shaft speed to input shaft speed.

6. A vehicle transmission system according to claim 5 wherein said output shaft speed is determined by dividing a value, which is directly proportional to said speed ratio, by a value which is inversely proportional to said input shaft speed.

7. A vehicle transmission system according to claim 4 wherein the accuracy of determination of said output shaft speed is independent of said output shaft speed over the entire range of obtainable values.

8. A vehicle transmission system according to claim 2 wherein said microprocessor means controls the transmission in accordance with a predetermined program in relation to driving conditions of said transmission.

9. A system according to claim 8 in which said means for sensing a plurality of operating conditions senses input and output speeds of at least one part of said system as well as signals related to the setting of a prime mover and directly supplies corresponding signals to the microprocessor means, said electronic control system further including buffer means connected to said microprocessor for receiving said signals from said sensing means.

10. A vehicle transmission system according to claim 9 wherein said movement sensing means comprises means for sensing output speed signals of the transmission and said microprocessor means processes said speed signals to obtain an acceleration factor and employs this factor in relation to the setting of said prime mover and the speed of prime mover in determining the transmission shift points.

11. A vehicle transmission system according to claim 4 wherein said electro-mechanical means comprise solenoid valves for controlling the setting of the vehicle transmission, said input signals being processed in accordance with a predetermined program to produce output signals which are fed to said solenoid valves.

12. A vehicle transmission system according to claim 11 wherein input signals related to the setting of a prime mover for said transmission are processed according to the program to control the operating conditions of the transmission.

13. A vehicle transmission system according to claim 12 in which said prime moves comprises an engine whose setting is utilized to influence in a predetermined manner a part of the program for controlling the operation of the microprocessor means so as to determine the shift points of the transmission.

14. A prime mover system comprising a prime mover, a vehicle transmission system and an electronic control system for controlling said transmission system by converting input signals thereto related to operating conditions of the prime mover system into output control signals for said transmission system in accordance with a predetermined set of criteria, said electronic control system comprising input means for sensing a plurality of prime mover system operating conditions and for producing signals comprising at least one series of pulses in accordance therewith, and programmable electronic signal processing means including a microprocessor for directly monitoring the state of said at least one series of pulses, said programmable electronic signal processing means further comprising means for storing coded programmable information representing at least part of said predetermined set of criteria, and for controlling the further operation of said microprocessor to produce output control signals in accordance with the state of said at least one series of pulses and said predetermined set of criteria, and said vehicle transmission system comprising electromechanical means responsive to said output control signals produced by programmable electronic signal processing means for controlling at least the setting of said vehicle transmission system.

15. A prime mover system comprising a prime mover, a vehicle transmission system and an electronic control system for controlling said vehicle transmission system by converting input signals thereto related to operating conditions of the prime mover system into output control signals for said transmission in accordance with a predetermined set of criteria, said electronic control system comprising input means for sensing a plurality of prime mover system operating conditions and for producing output signals comprising at least one series of pulses in accordance therewith; microprocessor means for monitoring the state of said at least one series of pulses; programmable read-only memory means, connected to said microprocessor means, for storing coded information representing at least part of said predetermined set of criteria, for transferring said coded information to said microprocessor means and for controlling the further operation of said microprocessor means; timing means for directly delivering clock pulses to said microprocessor means; output means, connected to said microprocessor means and including latch means, for producing output control signals under the control of said microprocessor means; and addressing means for coordinating the operation of at least said programmable read-only memory means and said latch means under the control of said microprocessor means, said vehicle transmission system comprising electromechanical means responsive to said output control signals for controlling at least the setting of said vehicle transmission.

16. A vehicle transmission system comprising, in combination, a vehicle transmission and an electronic control system for controlling said transmission by converting input signals thereto related to operating conditions of the transmission into output control signals for said transmission in accordance with a predetermined set of criteria, said electronic control system comprising input means for sensing a plurality of transmission operating conditions and producing input signals comprising pulses in accordance therewith, microprocessor means for monitoring the states of said input signals, programmable read-only memory means connected to said microprocessor means, timing means connected to said microprocessor means for directly delivering clock pulses to the microprocessor means, output means, connected to said microprocessor and including latch means, for producing output control signals under the control of said microprocessor means, and addressing -continued

| | |
|---|---|
| AD537JD | Voltage/frequency converter |

It will, of course, be understood that equivalent components are available from several manufacturers, and in different variations, so that equivalent arrangements of components are possible without departing from the principles of the microcomputer of the invention.

In operation, the input signals applied via the input buffers 406 or the external signal input lines 419 are read in and processed, and output signals are determined. These output signals are transmitted via the output latches 420, 422 and power transistors 424 under the direction of the program stored in one, or two, exchangeable PROMs 404 as described above. It might be noted at this point that it is also possible to have two entirely different programs stored in two different PROMs, an arbitrary input signal or combination of input signals determining which PROM is to be utilized and thus which program is to be executed. As noted, the programs are a series of coded instructions and sets of data representing, for example, shift criteria or output sequences, which exactly determines the operation and coordination of the various components in the autopilot (control system) of FIG. 2.

Figure 9:
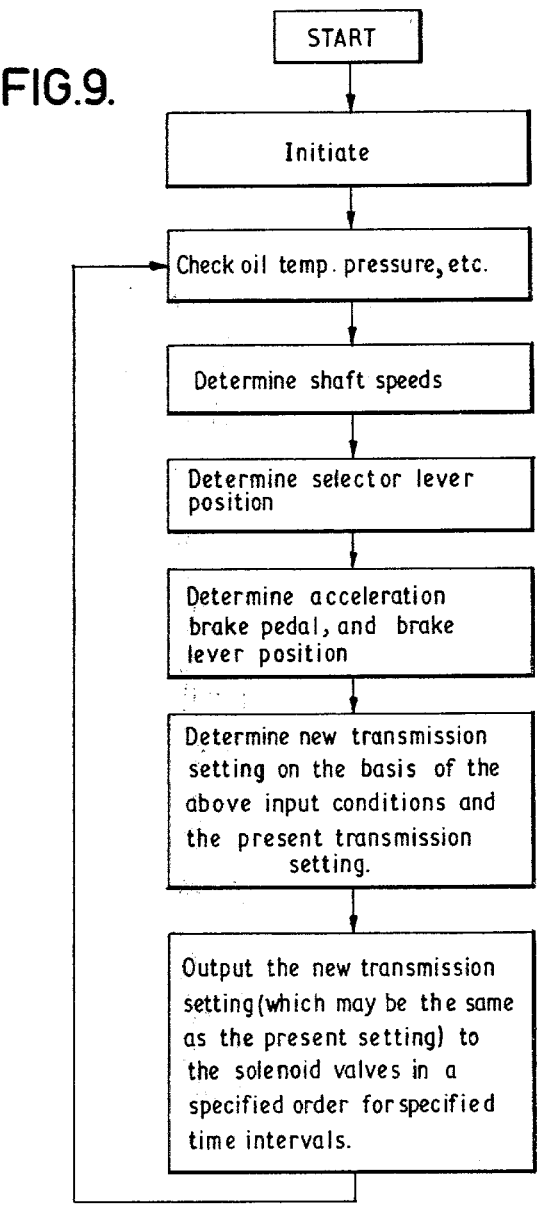
FIG. 9 is a generalized flow diagram setting forth the basic operations of the microcomputer of the invention.

The basic elements of the microcomputer program are shown in FIG. 9 and are largely self-explanatory. The program is started when the engine is started and, after the necessary initiation instructions, goes into a cycle which is repeated until the engine, and thus the autopilot is turned off. It is noted that the proper start of the microprocessor 400, and thus the program, is insured by means of a circuit arrangement connected to the "clear" input of the microprocessor 400 and consisting of a resistor 430, a capacitor 432, and a diode rectifier 434, together with timing gate 412 of a dual decoder circuit, (see FIG. 8). The gate circuit 412 delays the start of the microprocessor for about 1 millisecond, allowing all other components to be initialized, before energizing the microprocessor with a distinct signal transmitted to the "clear" input thereof.

As indicated in FIG. 9, a program cycle consists of three phases: input, test and output. During the input phase, the various input signals (shaft speeds, throttle position, selector lever position, etc.) are read in, evaluated, and stored for later use. These input signals together with the present or actual transmission setting are used, during the test phase, to determine a new transmission setting. (Of course, the new setting may be, and usually is, the same as the present setting). When the setting is determined, the signals corresponding to that setting are outputted during the output phase. In case of a change in setting (i.e., a shift), the output signals may be transmitted in a specified order and held for specified time intervals which can be determined with an accuracy of 16 microseconds. Thus, the transmission, and the engine, may be accurately controlled by means of the solenoid valves thereby insuring, among other things, gentle, smooth connections in the transmission. Since an entire set of output signals is transmitted which will be in effect during the whole of the next cycle and since the output latches 420, 422 hold these signals until new signals are received at the end of the next cycle, the power transistors 424 are held in the proper states thereof under the control of continuous signals which are periodically renewed. This gives an important measure of security against disturbances in the output circuits.

As discussed above, the electronic autopilot or microcomputer of the invention can be programmed for utilization of a wide variety of different input signals to control the torque converter setting and/or a mechanical gear setting. For a relatively simple case, such as 1½-stage torque converter alone, it may be sufficient if even not good control can be provided with primary speed and engine setting inputs. If a multi-stage mechanical gear is added, the secondary shaft speed signals or output shaft speed signals then become necessary. For more advanced torque converters, such as those which provide selective release or connection of the guide vanes and possible use as a turbine, with, for example, a releaseable torque transmitting bladed part, it becomes necessary, or at least highly preferable, to also utilize inputs corresponding to a primary shaft speed and a secondary shaft speed. This is also necessary when a mechanical complementary gear is used, even if, for a mechanical gear alone, the secondary shaft speed and engine setting may be sufficient.

It will be appreciated that immediately preceding discussion does not take into consideration the setting of the feeder fluid gear pump, the maximum pressure values and temperature and oil level safety signals and these also can be fed into the microcomputer as a basis for deciding when connections or disconnections are to be made.

The input signals can also be utilized in a variety of different ways. For example, it is quite obvious that in the examplary embodiment, a signal indicating an excessive temperature can be used to energize a warning lamp and/or disconnection of the pump, and a predetermined time delay can be provided between the warming lamp and the release of the pump. The same can be said for the oil level signals and possibly other "safety signals" which might be desirable to incorporate.

In providing the basic control for the setting of a transmission in different driving conditions or braking conditions and assuming that the transmission is of the type described above, the input speed and output speed are normally measured, and under some circumstances, an intermediate speed, i.e., the turbine speed, as well as the engine setting, are also determined. For shifting between single rotation and double rotation, i.e., between the brakes 26 and 24, is the ratio between the primary speed and the turbine speed, either as directly measured or calculated from the speed of the output shaft TOS in relation to the transmission setting. Thus, in a simple example of controlling shifting between single rotation and double rotation, the microprocessor 400 would be programmed to calculate the speed ratio from signals corresponding to the speeds in question (as derived from the speed sensors discussed above) and then compare this ratio with a predetermined value stored, e.g., in one of the PROMs 404, to determine whether shifting is appropriate. A typical reference value is about 0.4 for double rotation.

Such a speed ratio is also used to control the setting of the 3-element pump arrangement 300 shown in FIG. 2. Such speed ratio is also utilized in connection of the direct drive (with a reference ratio of 0.7 being typical) whereas disconnection of the direct drive is made related to speed. The setting of the torque converter, and especially the connection of direct drive, can suitably be controlled by a so-called kick-down function resulting in a later connection of the direct drive and an earlier disconnection. When the throttle pedal is released, a signal indicating this condition is fed into the electronic autopilot and compared with the engine speed or primary speed, and may be used to disconnect the converter completely i.e., both brakes 26 and 24 are then disconnected. Such disconnection, however, is also related to the manual setting signals and the disconnection of the pump member. Thus, in general, the system can be programmed to provide any desired operation of the torque converter as long as one has input information relating to input speed, i.e., engine speed and turbine speed (as directly measured or calculated from the transmission output shaft speed) and the throttle or fuel injection setting, including kick-down. This is only to indicate that if throttle position input signals are available, these can be used in a suitable manner to control connection and disconnection points of the direct drive.

The control of hydraulic braking, which, according to conventional systems, requires connection of direct drive and one of the brakes simultaneously, will depend principally on the output shaft speed or turbine shaft speed together with a manual setting signal which provides for a higher or lower amount of braking.

When there is a question of providing a suitable setting for a complementary gear, it is possible to obtain fairly good shift points by monitoring the engine setting and output shaft speed where the output shaft represents vehicle speed. But systems used prior to the pesent invention do not take into consideration variation of the shift points such as would be desired in dependence upon the weight of the vehicle and the grade of the hill to be climbed. However, the input signals mentioned above can be used to calculate the power delivered from the transmission and to compare this with the vehicle acceleration to provide for a gear setting which might be suitable from a fuel consumption saving standpoint, i.e., to provide higher gear ratios at lower vehicle speeds when the vehicle is heavily loaded and/or climbing a hill. It is then possible to use acceleration in relation to the output power to provide a sliding or variable value of speed where a selected gear setting is connected. The servo-cylinders CFI and CFC and the corresponding electro-hydraulic or electro-pneumatic valves FIV and FCV can be controlled to set engine fuel injection during a shift between gears. It might be mentioned that when calculating the acceleration of deceleration from the change of the output shaft speed, it is possible to program the microprocessor in such a way that a certain deceleration is automatically set related to a manual setting, within predetermined limits.

It will be appreciated that the actual programs used in controlling the operation of the microprocessor will vary widely depending on the vehicle transmission system which is to be controlled and the nature and complexity of the control to be provided. However, it will be understood that the programs involved will be quite straightforward and that one of ordinary skill in the art of programming will be able to readily provide suitable programs. In this regard, it is noted that only very simple tasks are required of the microprocessor, i.e., the straightforward mathematical evaluation and manipulation of predetermined input signals to provide corresponding output control signals. In general, this merely involves very simple calculations and comparisons with fixed or calculated values and such operations are, of course, extremely commonplace in computer programming. As set forth above, in one example, the ratio of signals corresponding to different input speeds would be determined by simply dividing one by the other and the resultant quotient then compared with a fixed constant. Where the quotient is less than the constant, one action (or no action) is to be taken and where the quotient exceeds the constant another action is to be taken (e.g., shift to double rotation). More complex control operations merely involve further but similar, manipulation of the input data with, for example, a large number of comparisons being made to take into consideration a number of factors before a given action is to be taken.

A number of further examples of the type of vehicle transmission operations which can be controlled by the system of the invention and the factors (including numerical examples provided in the drawings) to be taken into consideration in effecting various operations (i.e., shifting, etc.) are provided in commonly assigned U.S. Pat. No. 4,033,202 (Ahlen et al) issued on July 5, 1977 and the subject matter of that patent is hereby incorporated by reference. A further patent of interest in this general regard in U.S. Pat. No. 3,005,359 (Ahlen) issued on Oct. 24, 1961.

An example of one of the sensor/amplifier arrangements G1, G2 and G3 (see FIG. 2) is shown in FIG. 10. The sensor preferably comprises magneto-resistor 500 connected in a bridge with two trimming resistors 502 as shown. The magneto-resistor may be a Siemens FP212L100. A supply voltage is supplied the sensor as illustrated. A gear tooth 504, which contains iron and moves at constant speed past the magneto-resistor 500 in the plane of the drawing, produces a signal voltage in the form of a sine wave whose frequency corresponds to the rate at which the gear tooth rotates thereby. The gear tooth 504 is, if course, part of a toothed wheel mounted for rotation on the shaft whose speed is to be measured. The voltages across the two fixed resistors 502 are detected as shown. The difference between these two voltages is a stable sine wave voltage which forms the input to the amplifier.

The amplifier basically comprises a pair of operational amplifiers 506 and Schmitt trigger circuit 508, and produces TTL pulses with a frequency equal to that of the input sine wave. The amplifier may be located in the vicinity of the corresponding sensor as shown in FIG. 2, or at a distance from the sensor, in which case the amplifier and sensor are connected by a twisted pair cable 510 to eliminate the effect of outside disturbances. The sensor/amplifier arrangement described above has a very high upper frequency limit (over 10 KHz) and the special advantage of having no lower frequency limit. This means that all sensible shaft speeds, including very low speeds, can be accurately determined. The possibility of measuring low shaft speeds (and thus low vehicle velocities) is not available with conventional speed pick-ups (where the signal voltage from the pick-up is speed dependent), and is an important safety feature in many applications such as control of door opening on a bus.

Although the sensor may be supplied directly by the same voltage source as the amplifier (+5 V), in the illustrated embodiment the sensor is supplied with a potential difference of less than 3 V by means of the two transistor-rectifier pairs 502 connected as illustrated. This arrangement permits lower power dissipation in means for synchronizing the operation of said programmable read-only memory means and said latch means under the control of said microprocessor means, said electronic control system further comprising electromechanical means responsive to said output signals for controlling the operation of said vehicle transmission.

17. A system according to claim 16 including random access memory means connected to said microprocessor means for storing the states of signals being monitored and enabling arithmetical operations to be performed on said stored signals states.

18. A system according to claim 14, 15 or 16, in which the output means also include electrical switching means continuously controlled by said latch means.

19. A system according to claim 18 in which the electrical switching means comprise power transistors of a type having current limiting, power limiting, and thermal overload protection.

20. A system according to claim 19 in which the power transistors are provided with cooling means.

21. A system according to any one of claims 1, 14 or 15 wherein said input means includes a voltage/frequency converter means for converting at least one voltage input signal in a predetermined manner into a series of pulses to be fed directly to said microprocessor means.

22. A system according to claim 21 wherein said input means further comprises potentiometer means for directly controlling said voltage input signal.

23. A system according to claim 15 or 16 in which said addressing means comprises two quad D latches, one dual 1- of 4-decoder with active high outputs, and one dual 1-of 4-decoder with active low outputs.

24. A system according to any one of claims 1, 14 or 15 wherein said input means includes at least one delay circuit means, comprising one resistor, one capacitor and one rectifier, for delaying the change in at least one input signal and for limiting the level of said at least one signal.

25. A system according to claim 24 wherein said input means further comprises a switch for controlling the input signal to said at least one delay circuit means.

26. A system according to any one of claims 1, 14 or 15 wherein said input means includes at least one resistor-zener diode arrangement for limiting the current and voltage of at least one signal to be directly fed to the microprocessor means.

27. A system according to claim 15 or 16 wherein said timing means further comprises a circuit arrangement, comprising one resistor, one capacitor, one rectifier, and one gate means, for providing distinct starting signals to said microprocessor means.

28. A system according to claim 15, 16 or 17 wherein said electronic control system further comprises a voltage regulator means for providing a single stabilized supply of a predetermined potential for powering at least said microprocessor means, said addressing means, said programmable read-only memory means, and said latch means.

29. A prime mover system as claimed in claim 14 wherein said input means includes speed sensing means for sensing the output speed of said vehicle transmission system and producing a train of pulses representative of said output speed, the said programmable electronic signal processing means monitoring the output of said speed sensing means, successively storing time signals corresponding to timing intervals of the sensed output speed, and computing an acceleration factor in accordance with the output of said speed sensing means and said time signals, said acceleration factor being utilized by said programmable electronic signal processing means in generating at least one said output control signal.

30. A prime mover system as claimed in claim 14 wherein said at least one series of pulses is continuously supplied to said microprocessor, said electronic processing means being continuously operable and including means for providing temporary storage of said output control signals while further pulses of said train of pulses are monitored by said microprocessor so that the output control signals are based on continuously renewed input pulses.

31. A system according to claim 15 further comprising random accessy memory means, connected to the microprocessor means, for storing digital values comprising coded information received from the microprocessor means under the contol of said microprocessor means, and for subsequently presenting the stored digital to said microprocessor means under the control of said microprocessor means, said addressing means coordinating the operation of at least said random access memory means, the programmable read-only memory means, and the latch means.

32. A system according to any one of claims 14, 15 or 16 wherein the input means comprises means for producing at least two series of pulses indicative of distinct system operating conditions, said input means further comprising multiplexer means for selectively directing at least one of said at least two series of pulses to the microprocessor means so as to be monitored by said microprocessor means.

33. A system according to any one of claims 14, 15 or 16 wherein said input means comprises motion indicating means including movement sensing means for sensing the movement of at least one part of said system and for producing a resultant signal in accordance therewith, and means, connected to said movement sensing means, for producing at least one signal comprising a series of pulses in accordance with said resultant signal produced by said movement sensing means, the state of said at least one signal being monitored by the microprocessor means.

34. A system according to claim 33 wherein the range of frequencies of the pulses produced by said motion movement sensing means has the lower limit of zero Hz.

35. A system according to claim 33 in which said movement sensing means includes a magnetoresistive sensing arrangement and said signal producing means comprises amplifying means, including at least one operational amplifier, for providing said resultant signal.

36. A system according to claim 35 in which said magentoresistor and said amplifying means are connected together by a twisted-pair cable.

37. A system according to claim 33 in which the movement sensing means derives the energy necessary for producing the at least one sensed signal from an energy source other than an energy source maintained by the inertial energy of the part of the system whose movement is being sensed.

38. A system according to claim 37 in which the movement sensing means comprises a magnetoresitive sensing arrangement including at least one magnetoresistor.

39. A system according to claim 38 in which said magentoresistive sensing arrangement is operated with a potential difference of no more than 3 volts.

40. A system according to claim 39 in which said potential difference is maintained by a separate voltage regulator.

41. A system according to claim 38 in which said magnetoresistive sensing arrangement comprises a magnetoresistor connected in a bridge circuit together with a pair of fixed resistors such that said resultant signal comprises a voltage obtained across a connection between the two fixed resistors and a central terminal of said magnetoresistor.

* * * * *